(12) United States Patent
Huang et al.

(10) Patent No.: US 11,166,282 B2
(45) Date of Patent: Nov. 2, 2021

(54) EVOLVED NODE-B (ENB), RADIO ACCESS NETWORK (RAN) CENTRAL UNIT (RCU) AND METHODS FOR RADIO RESOURCE CONTROL (RRC)

(71) Applicant: Apple Inc., Cupertino, CA (US)

(72) Inventors: Min Huang, Beijing (CN); Feng Yang, Beijing (CN); Xu Zhang, Beijing (CN); Alexander Sirotkin, Tel-Aviv (IL)

(73) Assignee: Apple Inc., Cupertino, CA (US)

( * ) Notice: Subject to any disclaimer, the term of this patent is extended or adjusted under 35 U.S.C. 154(b) by 441 days.

(21) Appl. No.: 16/088,239

(22) PCT Filed: Jan. 25, 2017

(86) PCT No.: PCT/US2017/014893
§ 371 (c)(1),
(2) Date: Sep. 25, 2018

(87) PCT Pub. No.: WO2017/180221
PCT Pub. Date: Oct. 19, 2017

(65) Prior Publication Data
US 2020/0413472 A1    Dec. 31, 2020

Related U.S. Application Data

(63) Continuation of application No. PCT/US2017/014893, filed on Jan. 25, 2017.

(30) Foreign Application Priority Data

Apr. 12, 2016   (WO) ................ PCT/CN2016/079087

(51) Int. Cl.
*H04W 72/04* (2009.01)
*H04W 28/08* (2009.01)
(Continued)

(52) U.S. Cl.
CPC ....... *H04W 72/0486* (2013.01); *H04W 28/08* (2013.01); *H04W 28/0808* (2020.05);
(Continued)

(58) Field of Classification Search
CPC . H04W 76/27; H04W 72/04; H04W 72/0468; H04W 72/048; H04W 72/10;
(Continued)

(56) References Cited

U.S. PATENT DOCUMENTS 10,812,216 B2 * 10/2020 Black ................... H04L 1/0025
2012/0142357 A1 * 6/2012 Aminaka .......... H04W 36/0058
455/437

(Continued)

FOREIGN PATENT DOCUMENTS

TW           201811086 A    3/2018
WO    WO-2013125918 A1    8/2013

OTHER PUBLICATIONS

"3rd Generation Partnership Project; Technical Specification Group Radio Access Network; Study on New Radio Access Technology; Radio Access Architecture and Interfaces (Release 14)", 3GPP TR 38.801 V0.4.0 (Technical Report), (Aug. 2016), 36 pgs.

(Continued)

*Primary Examiner* — Magdi Elhag
(74) *Attorney, Agent, or Firm* — Kowert, Hood, Munyon, Rankin & Goetzel, P.C.

(57) ABSTRACT

Embodiments of an Evolved Node-B (eNB), radio access network (RAN) central unit (RCU) and methods for radio resource control (RRC) are generally described herein. A RAN distributed unit (RDU) at an eNB may communicate with an RCU of a cloud RAN to cooperatively perform RRC functionality for the eNB 104. The RDU 105 may receive a request for an RRC connection from a User Equipment (UE), and may request global load information from the (Continued)

RCU. The RDU may determine whether to establish the requested RRC connection based on the global load information when a response from the RCU is received before a predetermined time. The RDU may determine whether to establish the requested RRC connection based on local load information when the response from the RCU is not received before the predetermined time.

25 Claims, 10 Drawing Sheets

(51) Int. Cl.
  H04W 72/10 (2009.01)
  H04W 76/27 (2018.01)
  H04W 36/08 (2009.01)
  H04W 36/22 (2009.01)
(52) U.S. Cl.
  CPC ........... *H04W 36/08* (2013.01); *H04W 36/22* (2013.01); *H04W 72/10* (2013.01); *H04W 76/27* (2018.02)
(58) Field of Classification Search
  CPC ....... H04W 72/1257; H04W 36/00837; H04W 36/00; H04W 36/0069; H04W 36/08; H04W 36/22; H04W 28/08
  See application file for complete search history.

(56) References Cited

U.S. PATENT DOCUMENTS

| | | | |
|---|---|---|---|
| 2012/0252464 A1* | 10/2012 | Borst | H04W 36/22 455/443 |
| 2014/0018071 A1* | 1/2014 | Mennerich | H04W 48/18 455/434 |
| 2014/0050103 A1 | 2/2014 | Niu et al. | |
| 2014/0226736 A1 | 8/2014 | Niu et al. | |
| 2014/0233459 A1 | 8/2014 | Dahod et al. | |
| 2014/0335859 A1* | 11/2014 | Hahn | H04W 48/14 455/435.1 |
| 2014/0349667 A1 | 11/2014 | Hahn et al. | |
| 2015/0031360 A1* | 1/2015 | Choi | H04W 36/0085 455/436 |
| 2015/0055623 A1* | 2/2015 | Li | H04W 40/04 370/331 |
| 2015/0092704 A1 | 4/2015 | Chen | |
| 2015/0126235 A1 | 5/2015 | Cho et al. | |
| 2015/0139195 A1* | 5/2015 | Xiao | H04W 36/30 370/332 |
| 2016/0050601 A1 | 2/2016 | Jeong et al. | |
| 2016/0192181 A1* | 6/2016 | Choi | H04B 17/382 455/422.1 |

OTHER PUBLICATIONS

"International Application Serial No. PCT/US2017/014893, International Search Report dated Apr. 26, 2017", 3 pgs.

"International Application Serial No. PCT/US2017/014893, Written Opinion dated Apr. 26, 2017", 6 pgs.

Aurouz, Sebasrien, et al., "Crowd Dynamic Network Reconfiguration in Wireless DenseNets", [Online]. Retrieved from the Internet: <URL: https://pdfs.semanticscholar.org/c097/f16559cb09412445c673f656e9e820cd6254.pdf>, (Accessed: Jan. 30, 2017), 5 pgs.

Fujitsu, "The Benefits of Cloud-RAN Architecture in Mobile Network Expansion", Fusitsu Network Communications Inc.,, (Feb. 18, 2015), 1-7.

Gudipati, Aditya, et al., "SoftRAN: Software Defined Radio Access Network", Proceedings of the second ACM SIGCOMM workshop on Hot topics in software defined networking, (Aug. 16, 2013), 25-30.

I, Chih-Lin, et al., "Toward Green and Soft: A 5G Perspective", IEEE Communications Magazine: 5G Wireless Communication Systems: Prospects and Challenges, (Feb. 2014), 66-73.

Allowance Decision and Search Report for Taiwan Patent Application No. 106107251, dated Jul. 1, 2020, with English translation of Search Report, 5 pgs.

Fujitsu, "The Benefits of Cloud-RAN Architecture in Mobile Network Expansion", 2014, 8 pgs.

* cited by examiner

EVOLVED NODE-B (ENB), RADIO ACCESS NETWORK (RAN) CENTRAL UNIT (RCU) AND METHODS FOR RADIO RESOURCE CONTROL (RRC)

This application is a U.S. National Stage Filing under 35 U.S.C. 371 from international Application No. PCT/US2017/014893, filed Jan. 25, 2017 and published in English as WO 2017/180221 on Oct. 19, 2017, which claims priority under 35 USC 120 to International Application Serial No, PCT/CN2016/079087, filed Apr. 12, 2016, each of which is incorporated herein by reference in its entirety.

TECHNICAL FIELD

Embodiments pertain to wireless communications. Some embodiments relate to wireless networks including 3GPP (Third Generation Partnership Project) networks, 3GPP LTE (Long Term Evolution) networks, 3GPP LTE-A (LTE Advanced) networks, and/or Fifth Generation (5G) networks, although the scope of the embodiments is not limited in this respect. Some embodiments relate to cloud radio access network (RAN) arrangements. Some embodiments relate to internet-of-things (IoT) operation. Some embodiments relate to radio resource control (RRC) operations.

BACKGROUND

Base stations and mobile devices operating in a network may exchange data and related control information. Various control operations may be performed, including exchanging of control information between the base stations and mobile devices. In an example scenario, a large number of devices may be supported by the network. In this scenario, the exchanging of control information may be challenging. Accordingly, there is a general need for methods and systems for exchanging of control information and other control operations in these and other scenarios.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
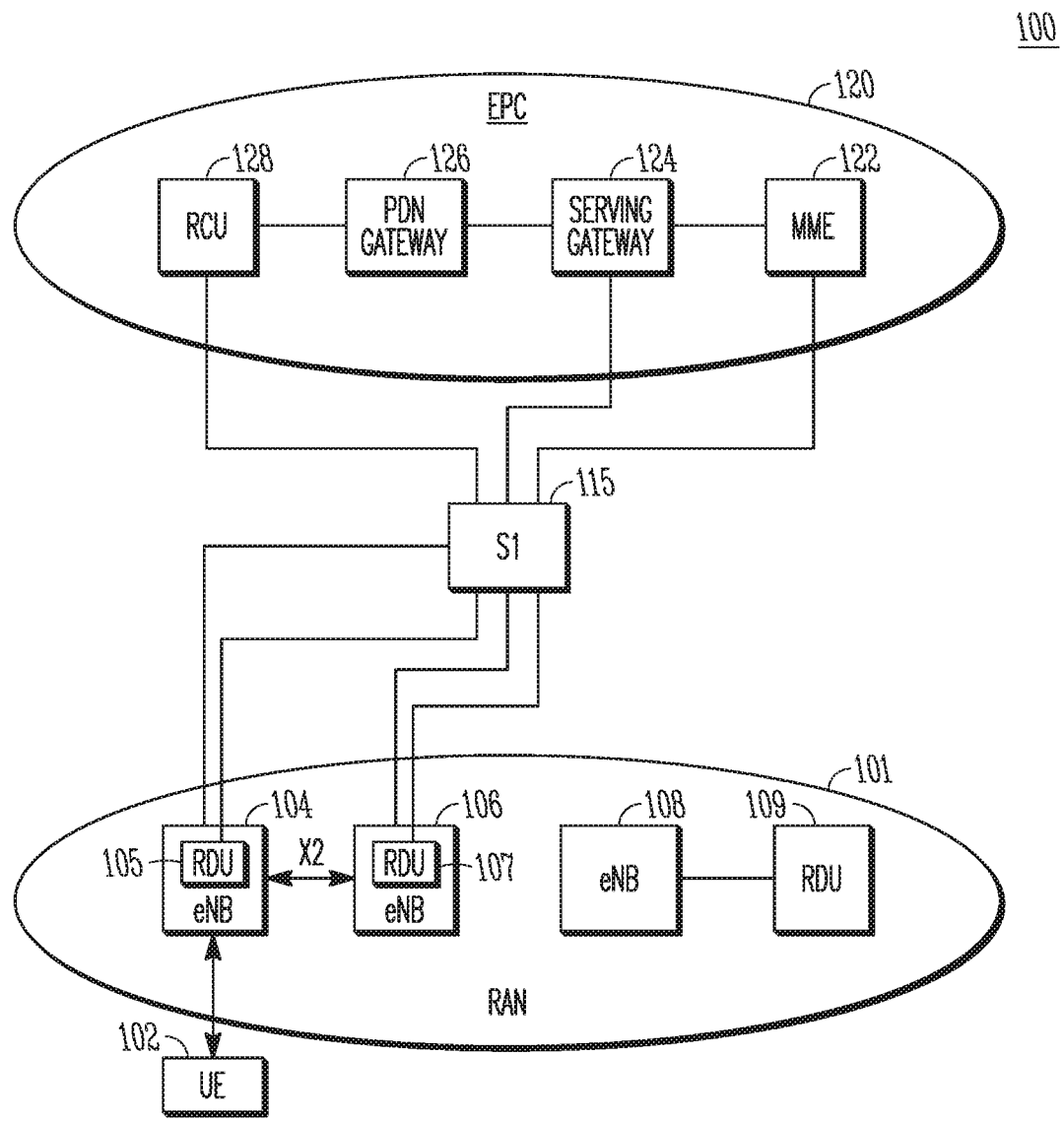
FIG. 1 is a functional diagram of a 3GPP network in accordance with some embodiments.

FIG. 1 is a functional diagram of a 3GPP network in accordance with some embodiments. It should be noted that embodiments are not limited to the example 3GPP network 100 shown in FIG. 1, as other networks may be used in some embodiments. As an example, a Fifth Generation (5G) network may be used in some cases. As another example, a cloud radio access network (RAN) may be used in some cases. As another example, a wireless local area network (WLAN) may be used in some cases.

In some embodiments, one or more techniques, operations and/or methods described herein may be performed in a network that includes one or more components shown in FIG. 1. In some embodiments, one or more techniques, operations and/or methods described herein may be performed in a network that includes one or more components shown in FIG. 7. In some embodiments, one or more techniques, operations and/or methods described herein may be performed in a network that includes one or more components shown in FIG. 1 and further includes one or more components shown in FIG. 7. Embodiments are not limited to the arrangement of components shown in FIG. 1 and are also not limited to the arrangement of components shown in FIG. 7.

Embodiments are not limited to these example networks, however, as other networks may be used in some embodiments. In some embodiments, a network may include one or more components shown in FIG. 1 and may further include one or more additional components. Embodiments are not limited to the arrangement or connectivity shown in FIG. 1. In addition, in some embodiments, one or more networks, including these example networks and/or other networks, may be used in combination. As an example, the UE 102 may be configured to communicate with a 3GPP network and with a WLAN in some cases. Such networks may or may not include some or all of the components shown in FIG. 1, and may include additional components and/or alternative components in some cases.

The network 100 may comprise a radio access network (RAN) (e.g., as depicted, the E-UTRAN or evolved universal terrestrial radio access network) 101 and the core network 120 (e.g., shown as an evolved packet core (EPC)) coupled together through an S1 interface 115. For convenience and brevity sake, only a portion of the core network 120, as well as the RAN 101, is shown.

The core network 120 may include a mobility management entity (MME) 122, a serving gateway (serving GW) 124, and/or packet data network gateway (PDN GW) 126. In some embodiments, the core network 120 may include a RAN central unit (RCU), although the scope of embodiments is not limited in this respect. The RCU 128 may not necessarily be included in the core network 120, in some embodiments.

The RAN 101 may include one or more Evolved Node-B's (eNBs) (such as 104, 106 and/or 108) which may operate as base stations for communicating with User Equipment (UE) 102. The eNBs 104 may include macro eNBs and/or low power (LP) eNBs, in some embodiments.

In some embodiments, an eNB (such as 104, 106) may include, host and/or implement a RAN distributed unit (RDU) (such as 105, 107). The scope of embodiments is not limited in this respect, however, as an eNB (such as 108)

may not necessarily include an RDU. In addition, an RDU (such as 109) may not necessarily be included in, hosted by and/or implemented in an eNB, in some embodiments. For instance, the eNB 108 may communicate with the RDU 109, although the RDU 109 may be a stand-alone device or may be hosted by another device. Such a stand-alone RDU 109 may communicate with a plurality of eNBs 104 and may perform radio resource control (RRC) operations on behalf of the plurality of eNBs, in some embodiments.

It should be noted that descriptions herein of some techniques, concepts, operations and/or methods may refer to the eNB 104 and the RDU 105 hosted by the eNB 104, but such descriptions are not limiting. Some or all of the techniques, concepts, operations and/or methods may be applicable to other arrangements, such as an arrangement in which the RDU 109 communicates with the eNB 108 and/or other eNBs. For instance, the RDU 109 may communicate with a plurality of eNBs.

In some embodiments, one or more of the UEs 102 may be configured to operate in accordance with a 5G protocol, 5G techniques, an internet-of-things (IoT) protocol and/or IoT techniques. In some embodiments, the eNB 104 may be configured to operate in accordance with a 5G protocol, 5G techniques, an IoT protocol and/or IoT techniques. In some embodiments, the UE 102 and/or eNB 104 may be configured to operate in accordance with a machine type communication (MTC) protocol and/or MTC techniques.

In some embodiments, the eNB 104 may receive control information and/or messages from a UE 102. The eNB 104 may also transmit control information and/or messages to the UE 102. These embodiments will be described in more detail below.

The MME 122 is similar in function to the control plane of legacy Serving GPRS Support Nodes (SGSN). The MME 122 manages mobility aspects in access such as gateway selection and tracking area list management. The serving GW 124 terminates the interface toward the RAN 100, and routes data packets between the RAN 101 and the core network 120. In addition, it may be a local mobility anchor point for inter-eNB handovers and also may provide an anchor for inter-3GPP mobility. Other responsibilities may include lawful intercept, charging, and some policy enforcement. The serving GW 124 and the MME 122 may be implemented in one physical node or separate physical nodes. The PDN GW 126 terminates an SGi interface toward the packet data network (PDN). The PDN GW 126 routes data packets between the EPC 120 and the external PDN, and may be a key node for policy enforcement and charging data collection. It may also provide an anchor point for mobility with non-LTE accesses. The external PDN can be any kind of IP network, as well as an IP Multimedia Subsystem (IMS) domain. The PDN GW 126 and the serving GW 124 may be implemented in one physical node or separated physical nodes.

The eNBs 104 (macro and micro) terminate the air interface protocol and may be the first point of contact for a UE 102. In some embodiments, an eNB 104 may fulfill various logical functions for the RAN 101 including but not limited to RNC (radio network controller functions) such as radio bearer management, uplink and downlink dynamic radio resource management and data packet scheduling, and mobility management. In accordance with embodiments, UEs 102 may be configured to communicate Orthogonal Frequency Division Multiplexing (OFDM) communication signals with an eNB 104 over a multicarrier communication channel in accordance with an Orthogonal Frequency Division Multiple Access (OFDMA) communication technique. The OFDM signals may comprise a plurality of orthogonal subcarriers.

The S1 interface 115 is the interface that separates the RAN 101 and the EPC 120. It is split into two parts: the S1-U, which carries traffic data between the eNBs 104 and the serving GW 124, and the S1-MME, which is a signaling interface between the eNBs 104 and the MME 122. The X2 interface is the interface between eNBs 104. The X2 interface comprises two parts, the X2-C and X2-U. The X2-C is the control plane interface between the eNBs 104, while the X2-U is the user plane interface between the eNBs 104.

With cellular networks, LP cells are typically used to extend coverage to indoor areas where outdoor signals do not reach well, or to add network capacity in areas with very dense phone usage, such as train stations. As used herein, the term low power (LP) eNB refers to any suitable relatively low power eNB for implementing a narrower cell (narrower than a macro cell) such as a femtocell, a picocell, or a micro cell. Femtocell eNBs are typically provided by a mobile network operator to its residential or enterprise customers. A femtocell is typically the size of a residential gateway or smaller and generally connects to the user's broadband line. Once plugged in, the femtocell connects to the mobile operator's mobile network and provides extra coverage in a range of typically 30 to 50 meters for residential femtocells. Thus, a LP eNB might be a femtocell eNB since it is coupled through the PDN GW 126. Similarly, a picocell is a wireless communication system typically covering a small area, such as in-building (offices, shopping malls, train stations, etc.), or more recently in-aircraft. A picocell eNB can generally connect through the X2 link to another eNB such as a macro eNB through its base station controller (BSC) functionality. Thus, LP eNB may be implemented with a picocell eNB since it is coupled to a macro eNB via an X2 interface. Picocell eNBs or other LP eNBs may incorporate some or all functionality of a macro eNB. In some cases, this may be referred to as an access point base station or enterprise femtocell.

In some embodiments, a downlink resource grid may be used for downlink transmissions from an eNB 104 to a UE 102, while uplink transmission from the UE 102 to the eNB 104 may utilize similar techniques. The grid may be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid correspond to one OFDM symbol and one OFDM subcarrier, respectively. The duration of the resource grid in the time domain corresponds to one slot in a radio frame. The smallest time-frequency unit in a resource grid is denoted as a resource element (RE). There are several different physical downlink channels that are conveyed using such resource blocks. With particular relevance to this disclosure, two of these physical downlink channels are the physical downlink shared channel and the physical down link control channel.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware. Embodiments described herein may be implemented into a system using any suitably configured hardware and/or software.

Figure 2:
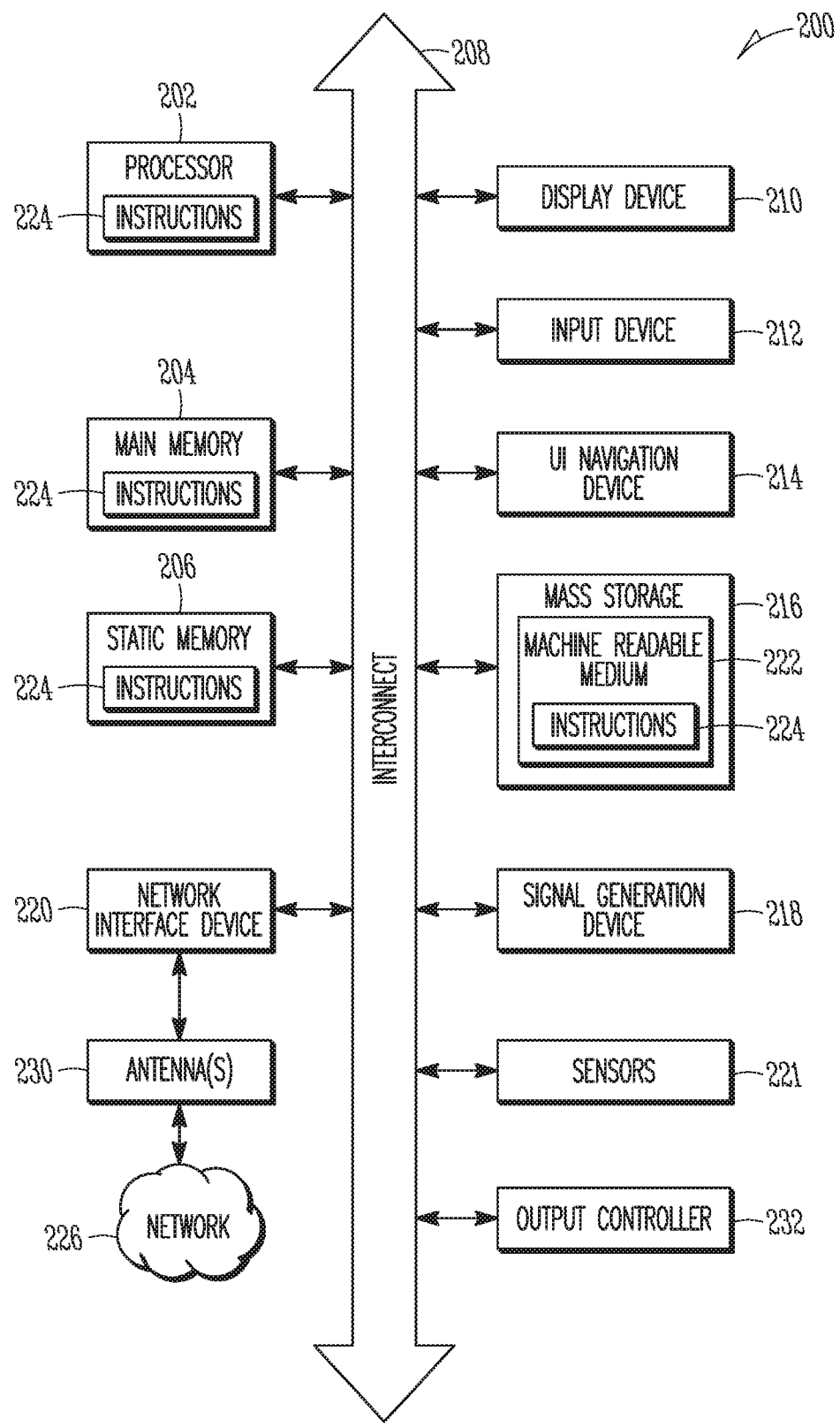
FIG. 2 illustrates a block diagram of an example machine in accordance with some embodiments.

FIG. 2 illustrates a block diagram of an example machine in accordance with some embodiments. The machine 200 is an example machine upon which any one or more of the techniques and/or methodologies discussed herein may be performed. In alternative embodiments, the machine 200 may operate as a standalone device or may be connected (e.g., networked) to other machines. In a networked deployment, the machine 200 may operate in the capacity of a server machine, a client machine, or both in server-client network environments. In an example, the machine 200 may act as a peer machine in peer-to-peer (P2P) (or other distributed) network environment. The machine 200 may be a UE 102, eNB 104, RDU 105, RCU 128, access point (AP), station (STA), mobile device, base station, personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The machine (e.g., computer system) 200 may include a hardware processor 202 (e.g., a central processing unit (CPU), a graphics processing unit (GPU), a hardware processor core, or any combination thereof), a main memory 204 and a static memory 206, some or all of which may communicate with each other via an interlink (e.g., bus) 208. The machine 200 may further include a display unit 210, an alphanumeric input device 212 (e.g., a keyboard), and a user interface (UI) navigation device 214 (e.g., a mouse). In an example, the display unit 210, input device 212 and UI navigation device 214 may be a touch screen display. The machine 200 may additionally include a storage device (e.g., drive unit) 216, a signal generation device 218 (e.g., a speaker), a network interface device 220, and one or more sensors 221, such as a global positioning system (GPS) sensor, compass, accelerometer, or other sensor. The machine 200 may include an output controller 228, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 216 may include a machine readable medium 222 on which is stored one or more sets of data structures or instructions 224 (e.g., software) embodying or utilized by any one or more of the techniques or functions described herein. The instructions 224 may also reside, completely or at least partially, within the main memory 204, within static memory 206, or within the hardware processor 202 during execution thereof by the machine 200. In an example, one or any combination of the hardware processor 202, the main memory 204, the static memory 206, or the storage device 216 may constitute machine readable media. In some embodiments, the machine readable medium may be or may include a non-transitory computer-readable storage medium.

While the machine readable medium 222 is illustrated as a single medium, the term "machine readable medium" may include a single medium or multiple media (e.g., a centralized or distributed database, and/or associated caches and servers) configured to store the one or more instructions 224. The term "machine readable medium" may include any medium that is capable of storing, encoding, or carrying instructions for execution by the machine 200 and that cause the machine 200 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine readable media. In some examples, machine readable media may include machine readable media that is not a transitory propagating signal.

The instructions 224 may further be transmitted or received over a communications network 226 using a transmission medium via the network interface device 220 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 220 may include one or more physical jacks (e.g., Ethernet, coaxial, or phone jacks) or one or more antennas to connect to the communications network 226. In an example, the network interface device 220 may include a plurality of antennas to wirelessly communicate using at least one of single-input multiple-output (SIMO), multiple-input multiple-output (MIMO), or multiple-input single-output (MISO) techniques. In some examples, the network interface device 220 may wirelessly communicate using Multiple User MIMO techniques. The term "transmission medium" shall be taken to include any intangible medium that is capable of storing, encoding or carrying instructions for execution by the machine 200, and includes digital or analog communications signals or other intangible medium to facilitate communication of such software.

Figure 3:
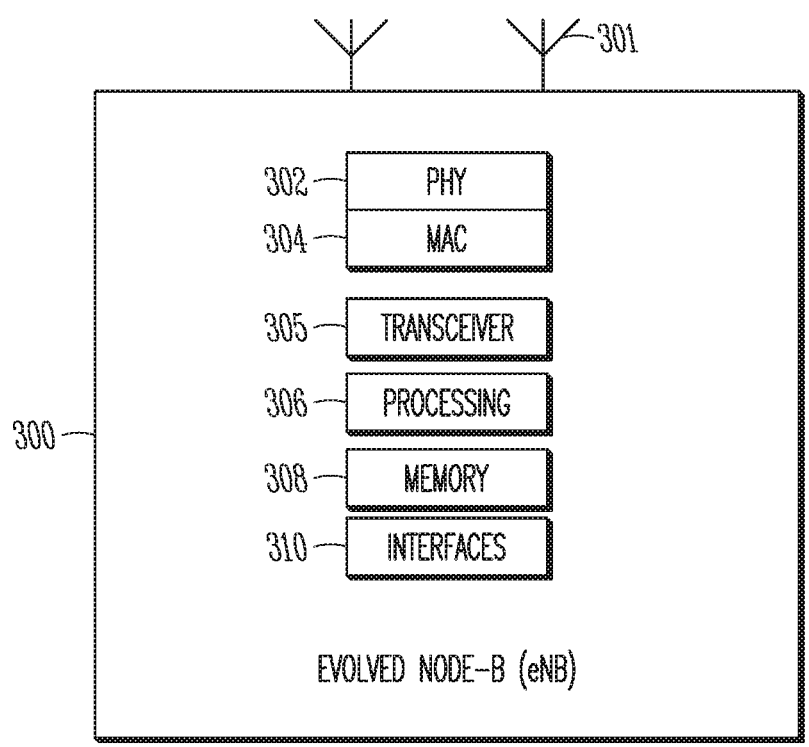
FIG. 3 is a block diagram of an Evolved Node-B (eNB) in accordance with some embodiments.

FIG. 3 is a block diagram of an Evolved Node-B (eNB) in accordance with some embodiments. It should be noted that in some embodiments, the eNB 300 may be a stationary non-mobile device. The eNB 300 may be suitable for use as an eNB 104 as depicted in FIG. 1. The eNB 300 may include physical layer circuitry 302 and a transceiver 305, one or both of which may enable transmission and reception of signals to and from the UE 200, other eNBs, other UEs or other devices using one or more antennas 301. As an example, the physical layer circuitry 302 may perform various encoding and decoding functions that may include formation of baseband signals for transmission and decoding of received signals. As another example, the transceiver 305 may perform various transmission and reception functions such as conversion of signals between a baseband range and a Radio Frequency (RF) range. Accordingly, the physical layer circuitry 302 and the transceiver 305 may be separate components or may be part of a combined component. In addition, some of the described functionality related to transmission and reception of signals may be performed by a combination that may include one, any or all of the physical layer circuitry 302, the transceiver 305, and other components or layers. The eNB 300 may also include medium access control layer (MAC) circuitry 304 for controlling access to the wireless medium. The eNB 300 may also include processing circuitry 306 and memory 308 arranged to perform the operations described herein. The eNB 300 may also include one or more interfaces 310, which may enable communication with other components, including other eNBs 104 (FIG. 1), components in the EPC 120 (FIG. 1) or other network components. In addition, the interfaces 310 may enable communication with other components that may not be shown in FIG. 1, including components external to the network. The interfaces 310 may be wired or wireless or a combination thereof. It should be noted that in some embodiments, an eNB or other base station may include some or all of the components shown in either FIG. 2 or FIG. 3 or both.

Figure 4:
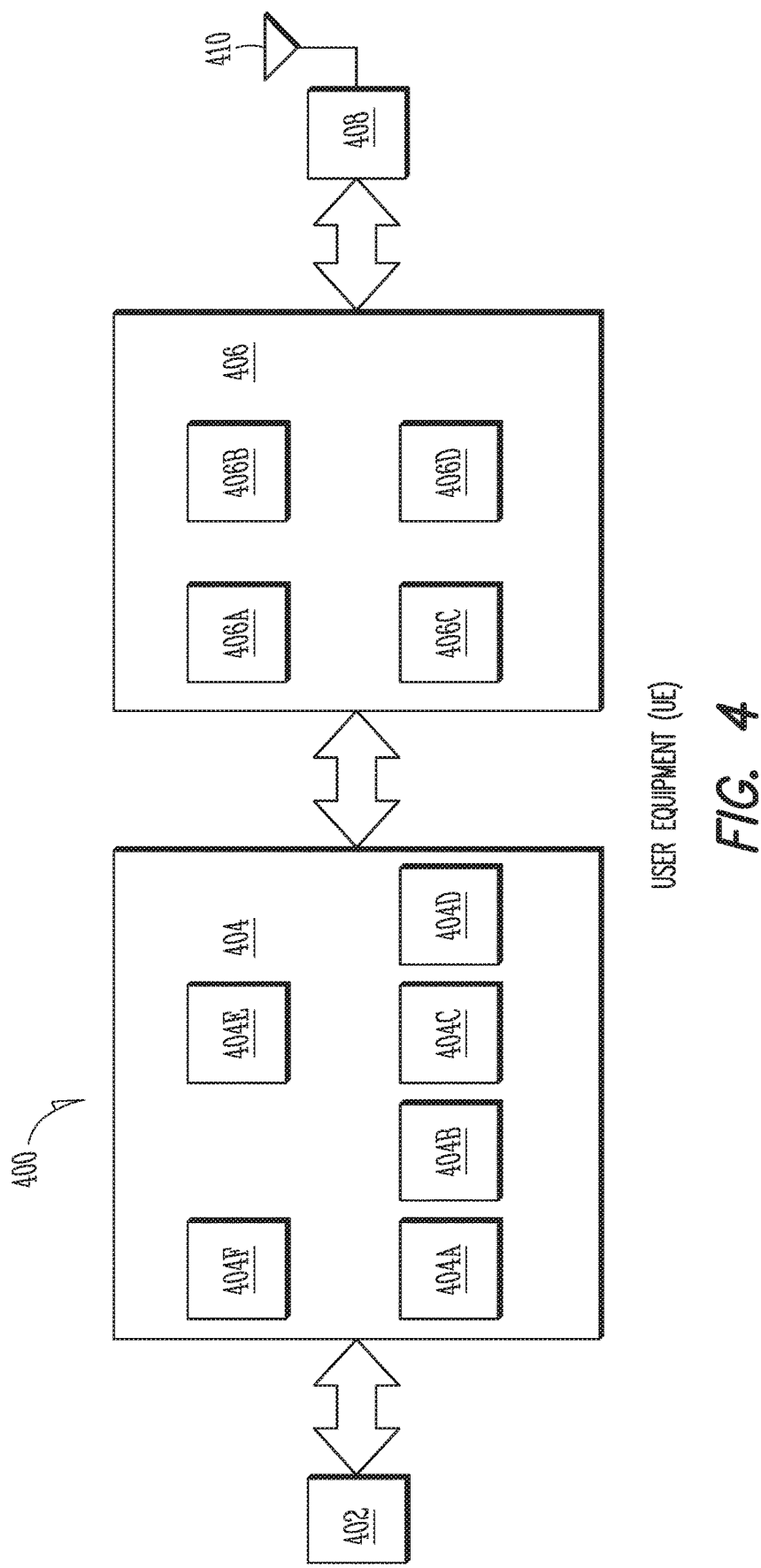
FIG. 4 is a block diagram of a User Equipment (UE) in accordance with some embodiments.

FIG. 4 is a block diagram of a User Equipment (UE) in accordance with some embodiments. The UE 400 may be suitable for use as a UE 102 as depicted in FIG. 1. In some embodiments, the UE 400 may include application circuitry 402, baseband circuitry 404, Radio Frequency (RF) circuitry 406, front-end module (FEM) circuitry 408 and one or more antennas 410, coupled together at least as shown. In some embodiments, other circuitry or arrangements may include one or more elements and/or components of the application circuitry 402, the baseband circuitry 404, the RF circuitry 406 and/or the FEM circuitry 408, and may also include other elements and/or components in some cases. As an example, "processing circuitry" may include one or more elements and/or components, some or all of which may be included in the application circuitry 402 and/or the baseband circuitry 404. As another example, a "transceiver" and/or "transceiver circuitry" may include one or more elements and/or components, some or all of which may be included in the RF circuitry 406 and/or the FEM circuitry 408. These examples are not limiting, however, as the processing circuitry, transceiver and/or the transceiver circuitry may also include other elements and/or components in some cases. It should be noted that in some embodiments, a UE or other mobile device may include some or all of the components shown in either FIG. 2 or FIG. 4 or both.

The application circuitry 402 may include one or more application processors. For example, the application circuitry 402 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage and may be configured to execute instructions stored in the memory/storage to enable various applications and/or operating systems to run on the system.

The baseband circuitry 404 may include circuitry such as, but not limited to, one or more single-core or multi-core processors. The baseband circuitry 404 may include one or more baseband processors and/or control logic to process baseband signals received from a receive signal path of the RF circuitry 406 and to generate baseband signals for a transmit signal path of the RF circuitry 406. Baseband processing circuitry 404 may interface with the application circuitry 402 for generation and processing of the baseband signals and for controlling operations of the RF circuitry 406. For example, in some embodiments, the baseband circuitry 404 may include a second generation (2G) baseband processor 404a, third generation (3G) baseband processor 404b, fourth generation (4G) baseband processor 404c, and/or other baseband processor(s) 404d for other existing generations, generations in development or to be developed in the future (e.g., fifth generation (5G), 6G, etc.). The baseband circuitry 404 (e.g., one or more of baseband processors 404a-d) may handle various radio control functions that enable communication with one or more radio networks via the RF circuitry 406. The radio control functions may include, but are not limited to, signal modulation/demodulation, encoding/decoding, radio frequency shifting, etc. In some embodiments, modulation/demodulation circuitry of the baseband circuitry 404 may include Fast-Fourier Transform (FFT), precoding, and/or constellation mapping/demapping functionality. In some embodiments, encoding/decoding circuitry of the baseband circuitry 404 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 404 may include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 404e of the baseband circuitry 404 may be configured to run elements of the protocol stack for signaling of the PHY, MAC, RLC, PDCP and/or RRC layers. In some embodiments, the baseband circuitry may include one or more audio digital signal processor(s) (DSP) 404f. The audio DSP(s) 404f may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 404 and the application circuitry 402 may be implemented together such as, for example, on a system on a chip (SOC).

In some embodiments, the baseband circuitry 404 may provide for communication compatible with one or more radio technologies. For example, in some embodiments, the baseband circuitry 404 may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry 404 is configured to support radio communications of more than one wireless protocol may be referred to as multi-mode baseband circuitry.

RF circuitry 406 may enable communication with wireless networks using modulated electromagnetic radiation through a non-solid medium. In various embodiments, the RF circuitry 406 may include switches, filters, amplifiers, etc. to facilitate the communication with the wireless network. RF circuitry 406 may include a receive signal path which may include circuitry to down-convert RF signals received from the FEM circuitry 408 and provide baseband signals to the baseband circuitry 404. RF circuitry 406 may also include a transmit signal path which may include circuitry to up-convert baseband signals provided by the baseband circuitry 404 and provide RF output signals to the FEM circuitry 408 for transmission.

In some embodiments, the RF circuitry 406 may include a receive signal path and a transmit signal path. The receive signal path of the RF circuitry 406 may include mixer circuitry 406a, amplifier circuitry 406b and filter circuitry 406c. The transmit signal path of the RF circuitry 406 may include filter circuitry 406c and mixer circuitry 406a. RF circuitry 406 may also include synthesizer circuitry 406d for synthesizing a frequency for use by the mixer circuitry 406a of the receive signal path and the transmit signal path. In some embodiments, the mixer circuitry 406a of the receive signal path may be configured to down-convert RF signals received from the FEM circuitry 408 based on the synthesized frequency provided by synthesizer circuitry 406d. The amplifier circuitry 406b may be configured to amplify the down-converted signals and the filter circuitry 406c may be a low-pass filter (LPF) or band-pass filter (BPF) configured to remove unwanted signals from the down-converted signals to generate output baseband signals. Output baseband signals may be provided to the baseband circuitry 404 for further processing. In some embodiments, the output baseband signals may be zero-frequency baseband signals, although this is not a requirement. In some embodiments, mixer circuitry 406a of the receive signal path may comprise passive mixers, although the scope of the embodiments is not limited in this respect. In some embodiments, the mixer circuitry 406a of the transmit signal path may be configured to up-convert input baseband signals based on the synthesized frequency provided by the synthesizer circuitry 406d to generate RF output signals for the FEM circuitry 408. The baseband signals may be provided by the baseband circuitry 404 and may be filtered by filter circuitry 406c. The filter circuitry 406c may include a low-pass filter (LPF), although the scope of the embodiments is not limited in this respect.

In some embodiments, the mixer circuitry 406a of the receive signal path and the mixer circuitry 406a of the transmit signal path may include two or more mixers and may be arranged for quadrature downconversion and/or upconversion respectively. In some embodiments, the mixer circuitry 406a of the receive signal path and the mixer circuitry 406a of the transmit signal path may include two or more mixers and may be arranged for image rejection (e.g., Hartley image rejection). In some embodiments, the mixer circuitry 406a of the receive signal path and the mixer circuitry 406a may be arranged for direct downconversion and/or direct upconversion, respectively. In some embodiments, the mixer circuitry 406a of the receive signal path and the mixer circuitry 406a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 406 may include analog-to-digital converter (ADC) and digital-to-analog converter (DAC) circuitry and the baseband circuitry 404 may include a digital baseband interface to communicate with the RF circuitry 406. In some dual-mode embodiments, a separate radio IC circuitry may be provided for processing signals for each spectrum, although the scope of the embodiments is not limited in this respect.

In some embodiments, the synthesizer circuitry 406d may be a fractional-N synthesizer or a fractional N/N+1 synthesizer, although the scope of the embodiments is not limited in this respect as other types of frequency synthesizers may be suitable. For example, synthesizer circuitry 406d may be a delta-sigma synthesizer, a frequency multiplier, or a synthesizer comprising a phase-locked loop with a frequency divider. The synthesizer circuitry 406d may be configured to synthesize an output frequency for use by the mixer circuitry 406a of the RF circuitry 406 based on a frequency input and a divider control input. In some embodiments, the synthesizer circuitry 406d may be a fractional N/N+1 synthesizer. In some embodiments, frequency input may be provided by a voltage controlled oscillator (VCO), although that is not a requirement. Divider control input may be provided by either the baseband circuitry 404 or the applications processor 402 depending on the desired output frequency. In some embodiments, a divider control input (e.g., N) may be determined from a look-up table based on a channel indicated by the applications processor 402.

Synthesizer circuitry 406d of the RF circuitry 406 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 406d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency ($f_{LO}$). In some embodiments, the RF circuitry 406 may include an IQ/polar converter.

FEM circuitry 408 may include a receive signal path which may include circuitry configured to operate on RF signals received from one or more antennas 410, amplify the received signals and provide the amplified versions of the received signals to the RF circuitry 406 for further processing. FEM circuitry 408 may also include a transmit signal path which may include circuitry configured to amplify signals for transmission provided by the RF circuitry 406 for transmission by one or more of the one or more antennas 410.

In some embodiments, the FEM circuitry 408 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 406). The transmit signal path of the FEM circuitry 408 may include a power amplifier (PA) to amplify input RF signals (e.g., provided by RF circuitry 406), and one or more filters to generate RF signals for subsequent transmission (e.g., by one or more of the one or more antennas 410. In some embodiments, the UE 400 may include additional elements such as, for example, memory/storage, display, camera, sensor, and/or input/output (I/O) interface.

It should be noted that one or more of the components, concepts, techniques and/or operations described in relation to FIG. 4 for the UE 400 may be applicable to an eNB 104, 300, in some embodiments. In some embodiments, one or more components (and/or similar components) shown in FIG. 4 may be included in the eNB 104, 300. For instance, the eNB 104, 300 may include one or more components shown in FIG. 4, in addition to or instead of one or more components of FIG. 2 and/or FIG. 3. In addition, one or more of the concepts, techniques and/or operations described regarding the UE 400 (and/or component(s) of the UE 400) may be practiced by the eNB 104, 300, in some embodiments.

The antennas 230, 301, 410 may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas 230, 301, 410 may be effectively separated to take advantage of spatial diversity and the different channel characteristics that may result.

In some embodiments, the UE 400 and/or the eNB 300 may be a mobile device and may be a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a wearable device such as a medical device (e.g., a heart rate monitor, a blood pressure monitor, etc.), or other device that may receive and/or transmit information wirelessly. In some embodiments, the UE 400 or eNB 300 may be configured to operate in accordance with 3GPP standards, although the scope of the embodiments is not limited in this respect. Mobile devices or other devices in some embodiments may be configured to operate according to other protocols or standards, including 5G standards, IEEE 802.11 or other IEEE standards. In some embodiments, the UE 400, eNB 300 or other device may include one or more of a keyboard, a display, a non-volatile memory port, multiple antennas, a graphics processor, an application processor, speakers, and other mobile device elements. The display may be an LCD screen including a touch screen.

Figure 5:
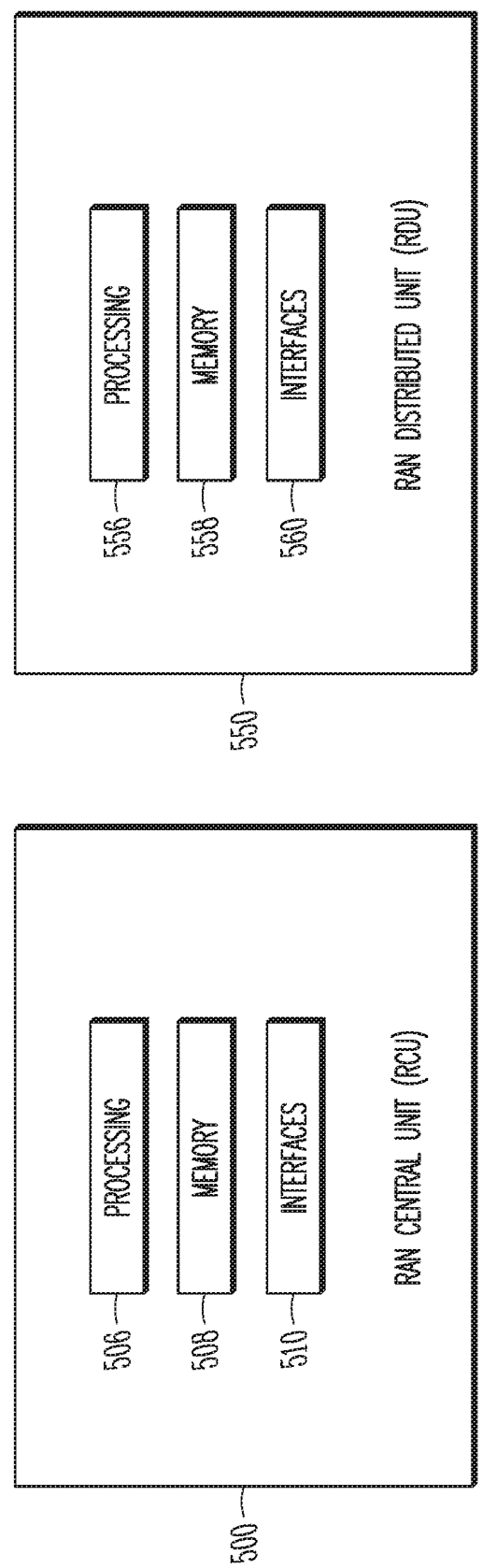
FIG. 5 illustrates a block diagram of a radio access network (RAN) central unit (RCU) and a block diagram of a RAN distributed unit (RDU) in accordance with some embodiments.

FIG. 5 illustrates a block diagram of a radio access network (RAN) central unit (RCU) and a block diagram of a RAN distributed unit (RDU) in accordance with some embodiments. It should be noted that in some embodiments, the RCU 500 may be a stationary non-mobile device. The RCU 500 may be suitable for use as an RCU 128 as depicted in FIG. 1, in some embodiments. The RCU 500 may also include processing circuitry 506 and memory 508 arranged to perform the operations described herein. The RCU 500 may also include one or more interfaces 510, which may enable communication with other components, including other eNBs 104 (FIG. 1), components in the EPC 120 (FIG. 1) or other network components. In addition, the interfaces 510 may enable communication with other components that may not be shown in FIG. 1, including components external to the network. The interfaces 510 may be wired or wireless or a combination thereof. In some embodiments, the interfaces 510 of the RCU 500 may be or may be coupled to the S1 interface 115. It should be noted that in some embodiments, an RCU may include some or all of the components shown in either FIG. 2 or FIG. 5 or both.

In some embodiments, the RDU 550 may be a stationary non-mobile device. The RDU 550 may be suitable for use as an RDU 109 as depicted in FIG. 1, in some embodiments. The RDU 550 may also include processing circuitry 556 and memory 558 arranged to perform the operations described herein. The RDU 550 may also include one or more interfaces 560, which may enable communication with other components, including the RCU 128 (FIG. 1), eNBs 104 (FIG. 1), components in the EPC 120 (FIG. 1) or other network components. In addition, the interfaces 560 may enable communication with other components that may not be shown in FIG. 1, including components external to the network. The interfaces 560 may be wired or wireless or a combination thereof. In some embodiments, the interfaces 560 of the RDU 550 may be or may be coupled to the S1 interface 115. It should be noted that in some embodiments, an RDU may include some or all of the components shown in either FIG. 2 or FIG. 5 or both.

Although the UE 400, the eNB 300, the RCU 500 and the RDU 550 are each illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. Some embodiments may include one or more processors and may be configured with instructions stored on a computer-readable storage device.

In some embodiments, an apparatus for a UE may include various components shown in the UE 400 and/or the machine 200 as shown in FIGS. 2 and 4. Accordingly, techniques and operations described herein that refer to the UE 400 and/or 102 may be applicable to an apparatus for a UE.

In some embodiments, an apparatus for an eNB may include various components shown in the eNB 300 and/or the machine 200 as shown in FIGS. 2 and 3. Accordingly, techniques and operations described herein that refer to the eNB 300, 104, 106 and/or 108 may be applicable to an apparatus for an eNB.

In some embodiments, an apparatus for an RCU may include various components shown in the RCU 500 and/or the machine 200 as shown in FIGS. 2 and 5. Accordingly, techniques and operations described herein that refer to the RCU 500 and/or 128 may be applicable to an apparatus for an RCU.

In some embodiments, an apparatus for an RDU may include various components shown in the RDU 550 and/or the machine 200 as shown in FIGS. 2 and 5. Accordingly, techniques and operations described herein that refer to the RDU 500 and/or 109 may be applicable to an apparatus for an RDU.

In accordance with some embodiments, a radio access network (RAN) distributed unit (RDU) 105 may be implemented by the processing circuitry of an eNB 104. The RDU 105 may be implemented to communicate with a RAN central unit (RCU) 128 of a cloud RAN to cooperatively perform at least radio resource control (RRC) functionality for the eNB 104. The RDU 105 may decode a request for an RRC connection from a User Equipment (UE) 102. The RDU 105 may communicate, to the RCU, a service request for global load information to determine whether to establish the requested RRC connection. The global load information may be based at least partly on per-eNB load information of other eNBs 104 supported by the cloud RAN. The RDU may, when a service response from the RCU 128 is received before a predetermined time, determine whether to establish the requested RRC connection based at least partly on the global load information included in the service response. The RDU may, when a service response is not received before the predetermined time, determine whether to establish the requested RRC connection based on local load information of the eNB 104. The service response may be received in response to the service request. These embodiments are described in more detail below.

Figure 6:
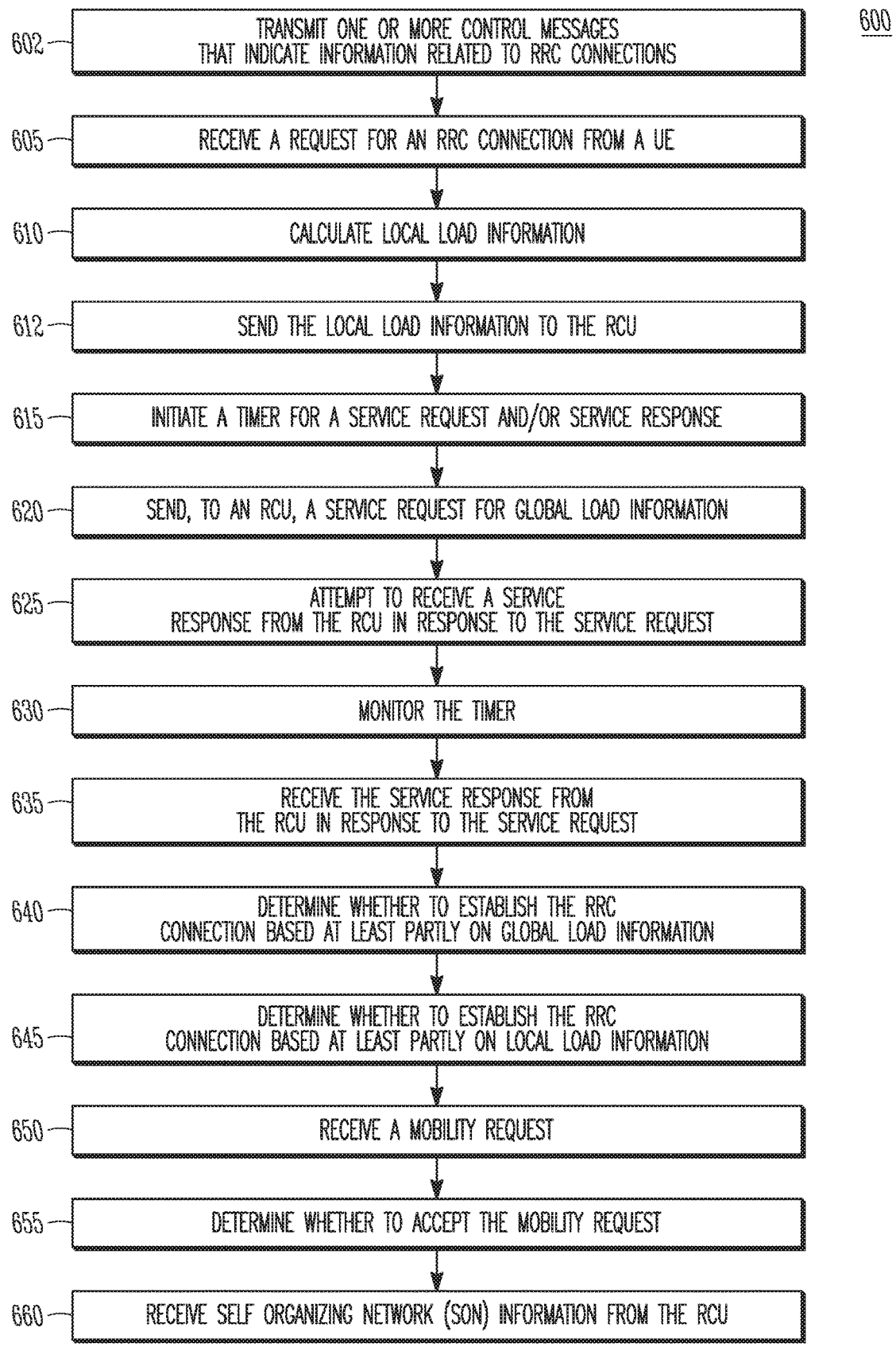
FIG. 6 illustrates the operation of a method of radio resource control (RRC) in accordance with some embodiments.

FIG. 6 illustrates the operation of a method of communication in accordance with some embodiments. It is important to note that embodiments of the method 600 may include additional or even fewer operations or processes in comparison to what is illustrated in FIG. 6. In addition, embodiments of the method 600 are not necessarily limited to the chronological order that is shown in FIG. 6. In describing the method 600, reference may be made to FIGS. 1-5 and 7-10, although it is understood that the method 600 may be practiced with any other suitable systems, interfaces and components.

In addition, while the method 600 and other methods described herein may refer to eNBs 104 or UEs 102 operating in accordance with 3GPP standards, 5G standards and/or other standards, embodiments of those methods are not limited to just those eNBs 104 or UEs 102 and may also be practiced on other devices, such as a Wi-Fi access point (AP) or user station (STA). In addition, the method 600 and other methods described herein may be practiced by wireless devices configured to operate in other suitable types of wireless communication systems, including systems configured to operate according to various IEEE standards such as IEEE 802.11. The method 600 may also refer to an apparatus for an RDU 105, eNB 104, UE 102 and/or other device described above.

It should be noted that one or more of the operations of the method 600 may be performed by the eNB 104, such as in processing circuitry and/or other component(s) of the eNB 104. In some embodiments, processing circuitry of the eNB 104 may implement the RDU and/or perform one or more operations of the method 600. In some embodiments, an RDU 105 may be implemented in the eNB 104, hosted by the eNB 104 and/or included in the eNB 104, and may perform one or more of the operations of the method 600. The scope of embodiments is not limited in this respect, however, as one or more operations of the method 600 may be performed by an eNB 104 in which an RDU 109 may not necessarily be implemented, hosted and/or included. In some embodiments, an RDU 109 may perform one or more of the operations of the method 600, and the RDU 109 may not necessarily be implemented in the eNB 104, hosted by the eNB 104 and/or included in the eNB 104. For instance, a stand-alone RDU 109 may perform one or more of the operations of the method 600, in some embodiments.

In some embodiments, one or more operations described herein, including but not limited to the operations of the method 600, may be performed by an eNB 104 at an RDU 105 implemented by the processing circuitry. The RDU 105 may communicate with a RAN central unit (RCU) 128 of a cloud RAN to cooperatively perform at least radio resource control (RRC) functionality for the eNB 104. It should be noted that one or more operations of the method 600 (and/or similar operations) may be performed by a stand-alone RDU (like 109), in some embodiments.

It should also be noted that embodiments are not limited by references herein (such as in descriptions of the methods 600, 900, 1000 and/or other descriptions herein) to transmission, reception and/or exchanging of elements such as frames, messages, requests, indicators, signals or other elements. In some embodiments, such an element may be generated, encoded or otherwise processed by processing circuitry (such as by a baseband processor included in the processing circuitry) for transmission. The transmission may be performed by a transceiver or other component, in some cases. In some embodiments, such an element may be decoded, detected or otherwise processed by the processing circuitry (such as by the baseband processor). The element may be received by a transceiver or other component, in some cases. In some embodiments, the processing circuitry and the transceiver may be included in a same apparatus. The scope of embodiments is not limited in this respect, however, as the transceiver may be separate from the apparatus that comprises the processing circuitry, in some embodiments.

At operation 602, the eNB 104 may transmit one or more control messages that indicate information related to RRC connections. For instance, the information may include RRC configuration information for usage by UEs 102 to request RRC connections, in some cases. The control messages may be or may include system information blocks (SIB), in some embodiments.

At operation 605, the eNB 104 may receive a request for an RRC connection from a User Equipment (UE) 102.

At operation 610, the eNB 104 may determine local load information of the eNB 104. In some embodiments, the local load information of the eNB 104 may be based at least partly on a number of RRC connections supported by the eNB 104. Other local load information may be related to data rates of the RRC connections and/or parameters of the RRC connections, in some cases. In some embodiments, the local load information of the eNB 104 may be based at least partly on a number of RRC connections at the eNB 104 and/or on data rates of the RRC connections at the eNB 104. These examples are not limiting, however, as the local load information may include other information in addition to, or instead of, the examples given above.

At operation 612, the eNB 104 may send the local load information to the RCU 128. In a non-limiting example, the local load information may be sent in response to a request from the RCU 128. In another non-limiting example, local load information may be sent periodically. In some embodiments, the local load information may be included in a service request message (such as at operation 620), although the scope of embodiments is not limited in this respect.

At operation 615, the eNB 104 may initiate a timer for a service request and/or service response.

At operation 620, the eNB 104 may send, to the RCU 128, a service request for global load information to determine whether to establish the requested RRC connection. The global load information may be based at least partly on per-eNB load information of other eNBs supported by the cloud RAN. In some embodiments, the per-eNB load information of the other eNBs may be based at least partly on numbers of RRC connections supported by the other eNBs. This example is not limiting, however, as other information, such as types of RRC connections, data rates and/or other information, may be included in the per-eNB load information of the other eNBs, in some cases.

At operation 625, the eNB 104 may attempt to receive a service response from the RCU 128 in response to the service request.

At operation 630, the eNB 104 may monitor the timer. One or more predetermined times, durations, expiration times and/or other may be used for the timer. Such values may be included in a 3GPP standard and/or other standard, in some cases, although embodiments are not limited to values that are necessarily included in a standard.

In some embodiments, the predetermined time may be based on a summation that includes a predetermined duration and an initiation time of the timer. Accordingly, the predetermined time may be a time at a predetermined duration after the initiation of the timer. For instance, the timer may expire after the predetermined duration has elapsed, with respect to the initiation time of the timer.

The eNB 104 may set a predetermined time (such as an expiration time, time duration and/or other) in any suitable manner. In some embodiments, the predetermined time may be indicated by the service request message, although the scope of embodiments is not limited in this respect. In some embodiments, the predetermined time may be included in a 3GPP standard and/or other standard and may not necessarily be indicated in the service request message.

In a non-limiting example, the predetermined time may be based on a priority level of the requested RRC connection. In another non-limiting example, the predetermined time may be a first value when the requested RRC connection is for mission critical (MC) communication and may be a second value when the requested RRC connection is for non-MC communication. The second value may be larger than the first value, in some cases. For instance, the MC communication may be considered higher priority than non-MC communication. The MC communication may also have time restrictions and/or limits that are lower than those of non-MC communication, in some cases. It should be noted that embodiments are not limited to usage of mission critical (MC) communication as described in this example or elsewhere herein. In some embodiments, critical machine type communication (MTC), ultra-reliable and low-latency communications (URLLC) and/or other type of communication may be used.

For instance, the predetermined time may be a first value when the requested RRC connection is for critical MTC and may be a second value when the requested RRC connection is for non-critical MTC. The critical MTC communication may be considered higher priority than non-critical MTC communication. The critical MTC communication may also have time restrictions and/or limits that are lower than those of non-critical MTC communication, in some cases.

For instance, the predetermined time may be a first value when the requested RRC connection is for URLLC and may be a second value when the requested RRC connection is for non-URLLC. The URLLC communication may be considered higher priority than non-URLLC communication. The URLLC communication may also have time restrictions and/or limits that are lower than those of non-URLLC communication, in some cases.

Other examples and embodiments described herein may use mission critical (MC) communication, MTC, URLLC and/or other communication, in some cases.

In another non-limiting example, a value of zero for the predetermined time may indicate that the RDU 105 does not intend to use the global load information to determine whether to establish the requested RRC connection, and a value greater than zero for the predetermined time indicates that the RDU 105 intends to use the global load information to determine whether to establish the requested RRC connection.

At operation 635, the eNB 104 may receive the service response from the RCU 128 in response to the service request. Accordingly, the eNB 104 may attempt to receive the service response from the RCU 128 in response to the service request, and may or may not successfully receive the service response, in some cases.

At operation 640, the eNB 104 may determine whether to establish the RRC connection based at least partly on global load information. At operation 645, the eNB 104 may determine whether to establish the RRC connection based at least partly on local load information. In some embodiments, a combination of local load information and global load information may be used. In some embodiments, memory of the eNB 104 and/or an apparatus of the eNB 104 may be configurable to store the global load information.

In some embodiments, when the service response from the RCU 128 is received in response to the service request before a predetermined time, the eNB 104 may determine whether to establish the requested RRC connection based at least partly on the global load information included in the service response. When the service response is not received in response to the service request before the predetermined time, the eNB 104 may determine whether to establish the requested RRC connection based at least partly on local load information of the eNB 104. The examples of predetermined time described above regarding operations 615 and/or 630 may be used, although the scope of embodiments is not limited in this respect.

In some embodiments, when the service response is received before the predetermined time, the eNB 104 may determine to establish the RRC connection when the number of RRC connections supported by the eNB 104 is less than or equal to a first threshold. The eNB 104 may also select another eNB 104 to establish the RRC connection when the number of RRC connections supported by the eNB 104 is greater than the first threshold and the number of RRC connections supported by the other eNB 104 is less than or equal to a second threshold. That is, the eNB 104 may decide that the RRC connection is to be established with the other eNB 104 (and not the eNB 104 requesting the RRC connection) in some cases. The first and second thresholds may or may not be the same.

In some embodiments, when the service response is not received before the predetermined time, the eNB 104 may determine to establish the RRC connection when the number of RRC connections supported by the eNB 104 is less than or equal to a third threshold. The eNB 104 may determine to refrain from establishment of the RRC connection when the number of RRC connections supported by the eNB 104 is greater than the third threshold. The third threshold may or may not be the same as the first or second thresholds.

At operation 650, the eNB 104 may receive a mobility request. The eNB 104 may determine whether to accept the mobility request at operation 655. In some embodiments, techniques similar to those of operations described above for determination of whether to accept the RRC connection may be used, although the scope of embodiments is not limited in this respect.

In some embodiments, the eNB 104 may receive a mobility request from a UE 102 for a hand-over of an RRC connection to the eNB 104 from another eNB 104 or for a hand-over of the RRC connection from the eNB 104 to another eNB 104. The eNB 104 may send, to the RCU 128, a service request for global load information to determine whether to accept the mobility request. When a service response is received in response to the service request before a predetermined time, the eNB 104 may determine whether to accept the mobility request based at least partly on global load information included in the service response. When the service response is not received in response to the service request before the predetermined time, the eNB 104 may determine whether to accept the mobility request based at least partly on local load information of the eNB 104.

At operation 660, the eNB 104 may receive self-organizing network (SON) information from the RCU 128. In some embodiments, the eNB 104 may transmit a request for the SON information from the RCU 128. The SON information may be based on cellular layout, sector layout, channel usage by the other eNBs 104 and/or other information. The eNB 104 may determine channel usage for the eNB 104 based at least partly on the received SON information, in some embodiments.

In some embodiments, the eNB 104 may send, to an RCU 128 of a cloud RAN, a service request for global load information of the cloud RAN for which the RCU 128 serves as a central entity for distribution of information between RDUs of the cloud RAN. The eNB 104 may determine whether to initiate a handover of an RRC connection between the eNB 104 and a UE 102 to another eNB 104 based at least partly on the global load information and further based at least partly on local load information of the eNB 104. The RDUs may be implemented at a plurality of eNBs 104 for performance of at least RRC functionality for the eNBs 104 cooperatively within the cloud RAN. The global information may be based at least partly on per-eNB load information of the eNBs 104. The eNB 104 may determine whether to initiate the handover as part of an RDU of the eNB 104 allocated at least partly to performance of RRC functionality for the eNB 104 cooperatively within the cloud RAN. The local load information may be based on a number of RRC connections supported by the eNB 104. The global load information may be based on per-eNB numbers of RRC connections supported by the plurality of eNBs 104. The eNB 104 may determine to initiate the handover of the RRC connection to another eNB 104 when the number of RRC connections supported by the eNB 104 is above a first threshold and when the number of RRC connections supported by the other eNB 104 is less than a second threshold.

Figure 7:
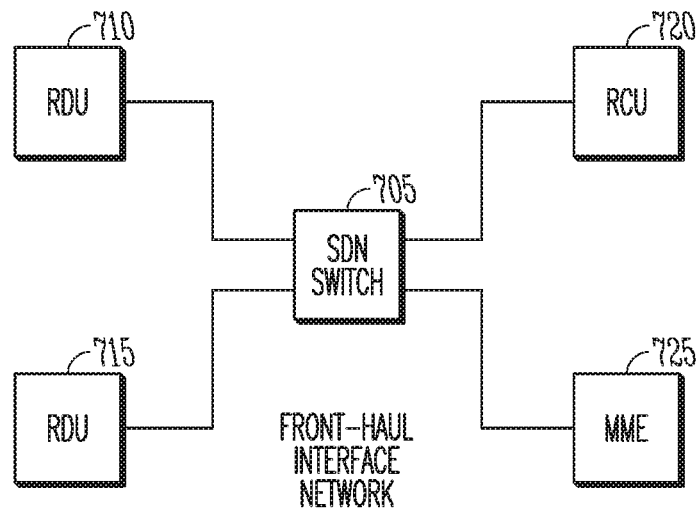
FIG. 7 illustrates an example network in accordance with some embodiments.
Figure 8:
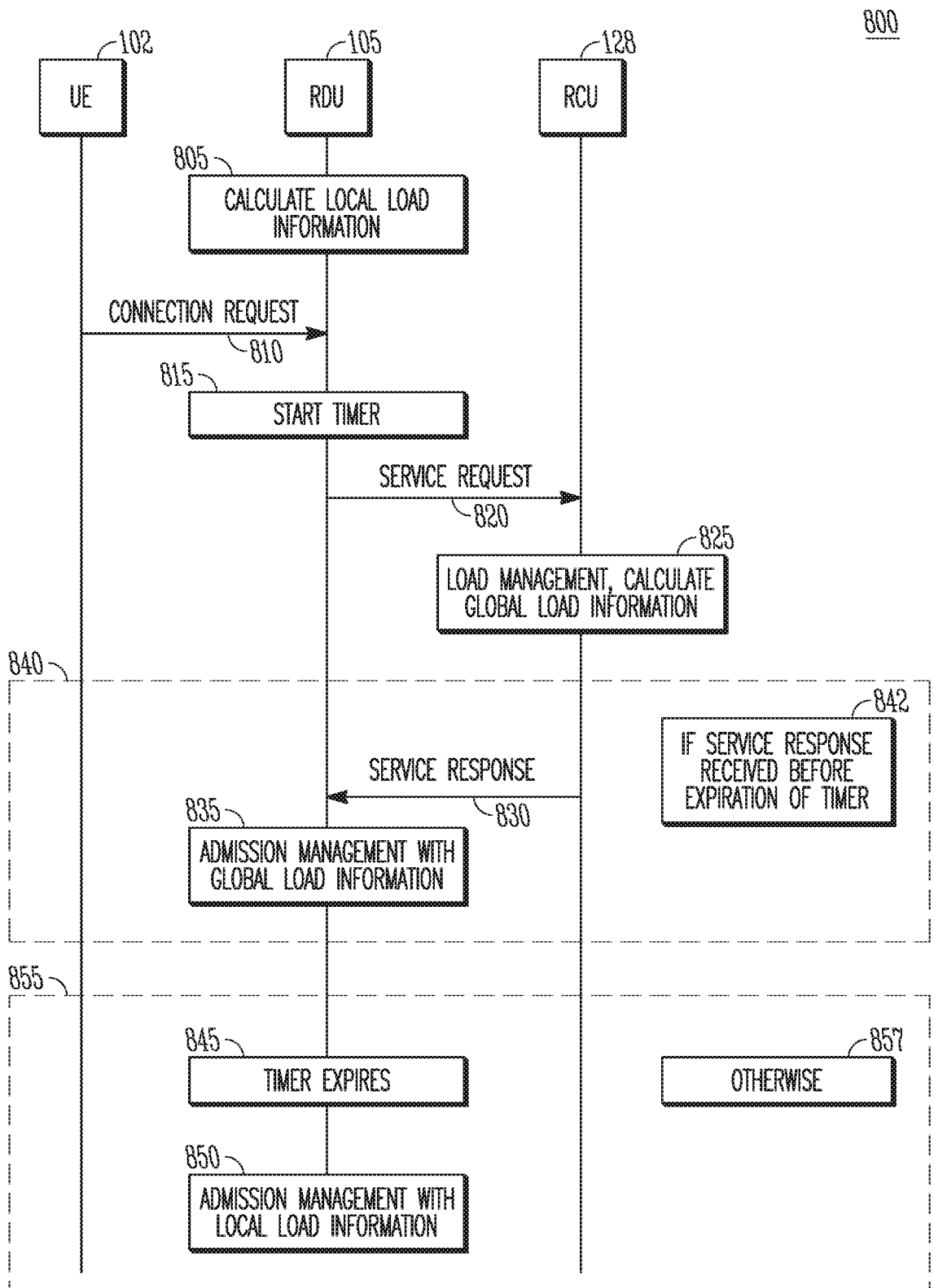
FIG. 8 illustrates example operations in accordance with some embodiments.

FIG. 7 illustrates an example network in accordance with some embodiments. FIG. 8 illustrates example operations in accordance with some embodiments. It should be noted that the examples shown in FIGS. 7-8 may illustrate some or all of the concepts and techniques described herein in some cases, but embodiments are not limited by the examples. For instance, embodiments are not limited by the name, number, type, size, ordering, arrangement and/or other aspects of the operations, components and other elements as shown in FIGS. 7-8. Although some of the elements shown in the examples of FIGS. 7-8 may be included in a 3GPP LTE standard and/or other standard, embodiments are not limited to usage of such elements that are included in standards.

Referring to FIG. 7, an example network architecture for C-RAN may comprise a central unit (RCU) 720 and a number of distributed units (RDUs) 710, 715. They may be connected by a front-haul interface (FI) network. In some embodiments, one or more of the RDUs 710, 715 may be stand-alone components. In some embodiments, one or more of the RDUs 710, 715 may be implemented by an eNB. In the following description, reference may be made to the RDU 710 for convenience, but such references are not limiting. It is understood that operations described below may be performed by either or both of RDUs 710 and 715, in some embodiments.

Referring to FIG. 8, an RDU 105 is shown, but it is understood that embodiments are not limited to the RDU. In some embodiments, processing circuitry of the eNB 104 may perform or be part of one or more operations shown in FIG. 8. At 805, the RDU 105 may calculate local load information. At 810, the UE 102 may transmit a connection request. At 815, the RDU 105 may start a timer. The RDU 105 may send a service request to the RCU 128 at 820. Load management and/or calculation of global load information may be performed by the RCU 128 at 825.

The box 840 indicates one or more operations (830 and/or 835 in this case) that may be performed if a service response is received before expiration of the timer. The service response may be sent from the RCU 128 to the RDU 105 at 830. Admission management with global load information may be performed by the RDU 105 at 835.

The box 855 indicates one or more operations (845 and/or 850 in this case) that may be performed if a service response is not received before expiration of the timer. The timer may expire at 845. Admission management with local load information may be performed by the RDU 105 at 850.

Figure 9:
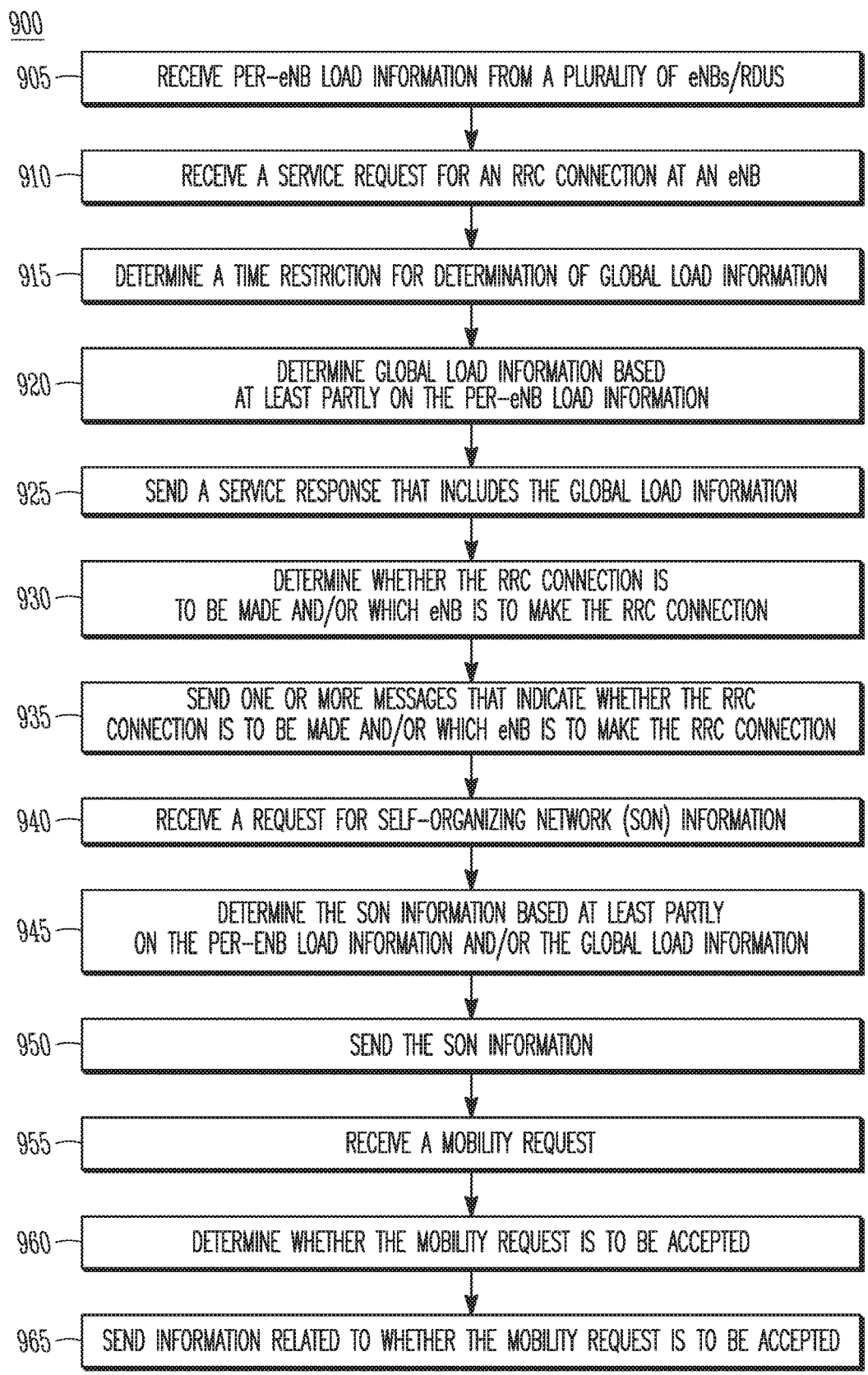
FIG. 9 illustrates the operation of another method of RRC in accordance with some embodiments.

FIG. 9 illustrates the operation of another method of communication in accordance with some embodiments. As mentioned previously regarding the method 600, embodiments of the method 900 may include additional or even fewer operations or processes in comparison to what is illustrated in FIG. 9 and embodiments of the method 900 are not necessarily limited to the chronological order that is shown in FIG. 9. In describing the method 900, reference may be made to FIGS. 1-8 and 10, although it is understood that the method 900 may be practiced with any other suitable systems, interfaces and components. In addition, embodiments of the method 900 may be applicable to RCUs 128, RDUs 105, UEs 102, eNBs 104, APs, STAs and/or other wireless or mobile devices. The method 900 may also be applicable to an apparatus for an RCU 128, RDU 105, UE 102, eNB 104 and/or other device described above.

It should be noted that the method 900 may be practiced by an RCU 128 and may include exchanging of elements, such as frames, signals, messages and/or other elements, with an eNB 104. Similarly, the method 600 may be practiced at an eNB 104 and may include exchanging of such elements with an RCU 128. In some cases, operations and techniques described as part of the method 600 may be relevant to the method 900. In addition, embodiments of the method 900 may include operations performed at the RCU 128 that are reciprocal to or similar to other operations described herein performed at the eNB 104. For instance, an operation of the method 900 may include reception of a message from the eNB 104 by the RCU 128 while an operation of the method 600 may include transmission of the same message or similar message by the eNB 104.

In addition, previous discussion of various techniques and concepts may be applicable to the method 900 in some cases, including cloud RAN, RDU, RCU, global load information, local load information, RRC operations, timers, connection request, mobility request, service request message, service response message and/or others. In addition, the examples shown in FIGS. 7-8 may also be applicable, in some cases, although the scope of embodiments is not limited in this respect.

At operation 905, the RCU 128 may receive, from an interface, per-eNB load information for a plurality of eNBs 104. In some embodiments, the per-eNB load information may be received from a plurality of RDUs hosted by the eNBs 104. The RCU 128 may operate as a central entity of a cloud RAN to communicate with the RDUs 105 to cooperatively perform at least RRC functionality for the eNBs 104. In a non-limiting example, the per-eNB load information of the plurality of eNBs 104 may be based at least partly on numbers of RRC connections supported by the eNBs 104. Other information may be used, in some embodiments, such as data rates of the RRC connections, types of RRC connections and/or other.

At operation 910, the RCU 128 may receive, from an interface, a service request from a particular RDU 105 that indicates an RRC connection request at the eNB 104 that hosts the particular RDU 105.

At operation 915, the RCU 128 may determine a time restriction for determination of global load information. For instance, the service request may include and/or indicate a predetermined time and/or timer value.

At operation 920, the RCU 128 may determine global load information based at least partly on the per-eNB load information. In some embodiments, the global load information may be determined in accordance with the time restriction determined at operation 915.

At operation 925, the RCU 128 may send, on the interface and to the particular RDU 105 and in response to the service request, a service response that includes the global load information.

At operation 930, the RCU 128 may determine whether the RRC connection is to be made and/or which eNB 104 is to make the RRC connection. In some embodiments, the RCU 128 may determine, based at least partly on the load information of the eNB 104 that hosts the particular RDU and on the load information of one or more neighboring eNBs 104, whether the eNB 104 is to establish the requested RRC connection. The RCU 128 may determine, based at least partly on the load information of the eNB 104 that hosts the particular RDU and on the load information of one or more neighboring eNBs 104, which of the eNBs 104 is to establish the requested RRC connection.

At operation 935, the RCU 128 may send one or more messages that indicate whether the RRC connection is to be made and/or which eNB is to make the RRC connection. For instance, the RCU 128 may send a message to the particular eNB 104 that is to establish the RRC connection.

At operation 940, the RCU 128 may receive a request for self-organizing network (SON) information. The request for the SON information may be received from a particular eNB 104, in some cases. At operation 945, the RCU 128 may determine the SON information based at least partly on the per-eNB load information and/or the global load information. In some embodiments, the SON information may be based at least partly on cellular layout, sector layout or channel usage by the plurality of eNBs 104. At operation 950, the RCU 128 may send the SON information. The SON information may be sent to the particular eNB 104 that requested it, other eNBs and/or other components.

At operation 955, the RCU 128 may receive a mobility request. The mobility request may be received from a particular eNB 104, in some cases. At operation 960, the RCU 128 may determine whether the mobility request is to be accepted. At operation 965, the RCU 128 may send information related to whether the mobility request is to be accepted. The information may be sent to the particular eNB 104 that requested it, other eNBs and/or other components.

In some embodiments, the RCU 128 may receive, from the interface, a service request from an RDU 105 that indicates a mobility request for a hand-over of an RRC connection from an eNB 104 that hosts the RDU 105. The RCU 128 may determine global load information. The RCU 128 may send, on the interface and to the RDU 105 and in response to the service request, a service response that includes the global load information. The global load information may be determined in accordance with a time restriction indicated in the service request message.

Figure 10:
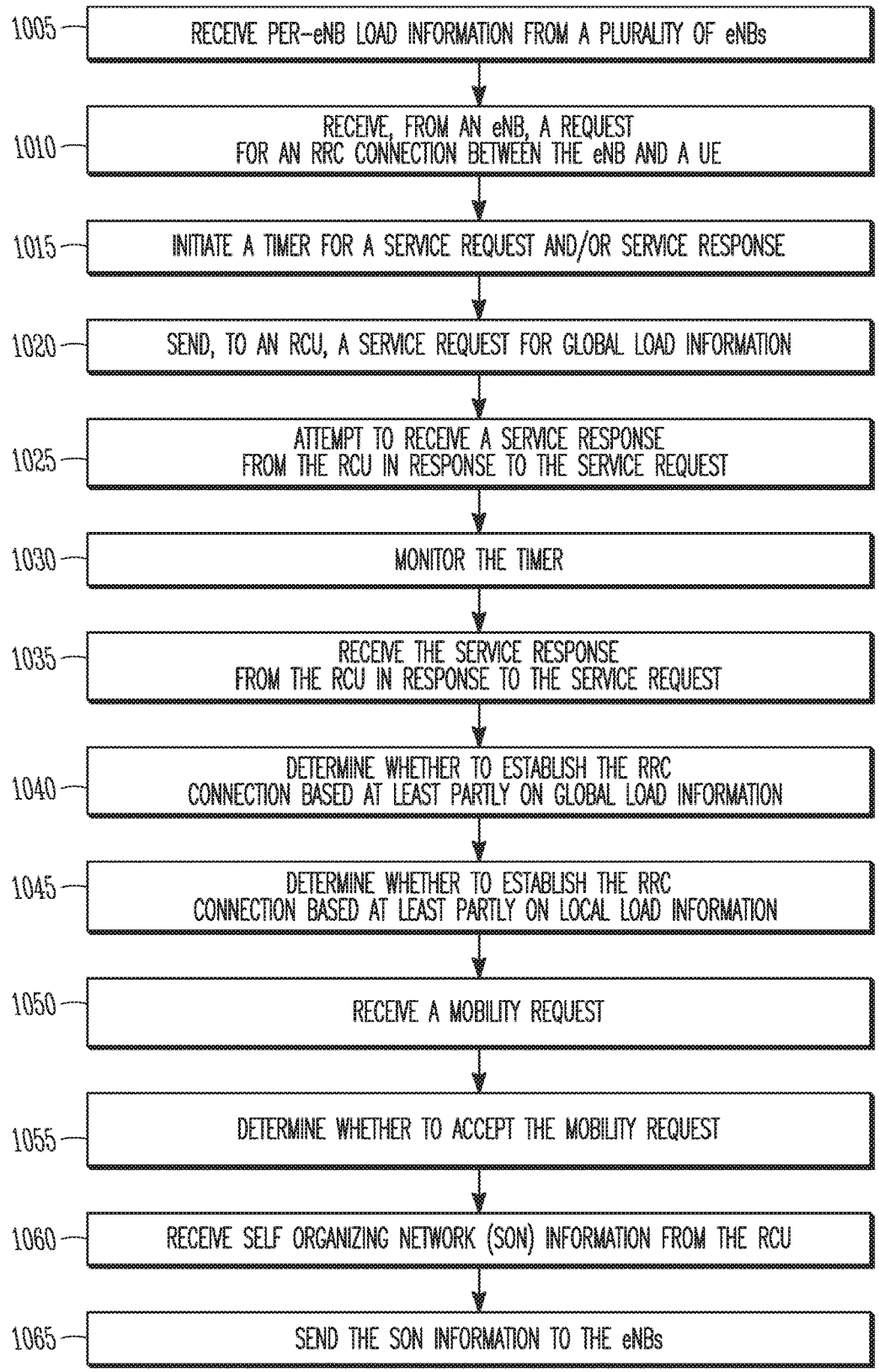
FIG. 10 illustrates the operation of another method of RRC in accordance with some embodiments.

FIG. 10 illustrates the operation of another method of communication in accordance with some embodiments. As mentioned previously regarding the method 600, embodiments of the method 1000 may include additional or even fewer operations or processes in comparison to what is illustrated in FIG. 10 and embodiments of the method 1000 are not necessarily limited to the chronological order that is shown in FIG. 10. In describing the method 1000, reference may be made to FIGS. 1-9, although it is understood that the method 1000 may be practiced with any other suitable systems, interfaces and components. In addition, embodiments of the method 1000 may be applicable to RCUs 128, RDUs 109, UEs 102, eNBs 104, APs, STAs and/or other wireless or mobile devices. The method 1000 may also be applicable to an apparatus for an RCU 128, RDU 109, UE 102, eNB 104 and/or other device described above.

The method 1000 may be performed by a stand-alone RDU 109. For instance, such as an RDU may not necessarily implemented at an eNB 104. Accordingly, one or more operations described as part of descriptions of the method 1000 may be similar to one or more operations described as part of descriptions of the method 600, although the scope of embodiments is not limited in this respect.

In addition, previous discussion of various techniques and concepts may be applicable to the method 1000 in some cases, including cloud RAN, RDU, RCU, global load information, local load information, RRC operations, timers, connection request, mobility request, service request message, service response message and/or others. In addition, the examples shown in FIGS. 7-8 may also be applicable, in some cases, although the scope of embodiments is not limited in this respect.

The RDU 109 may receive, on an interface, per-eNB load information from a plurality of eNBs 104 for which the RDU 109 is to perform RRC operations cooperatively with an RCU 128 of a cloud RAN. The RDU 109 may receive, from a particular eNB 104 of the plurality, an indicator of a request for an RRC connection between the particular eNB 104 and a UE 102. The RDU 109 may send, to the RCU 128 on the interface, a service request for global load information to determine whether to establish the requested RRC connection. The global load information may be based at least partly on per-eNB load information of other eNBs 104 supported by the cloud RAN. When a service response from the RCU 128 is received in response to the service request before a predetermined time, the RDU 109 may determine whether to establish the requested RRC connection based at least partly on the global load information included in the service response. When a service response is not received in response to the service request before the predetermined time, the RDU 109 may determine whether to establish the requested RRC connection based on the per-eNB load information of the plurality of eNBs 104. The RDU 109 may send, to the particular eNB 104 on the interface, an indicator of whether the RRC connection is to be established.

In some embodiments, cloud radio access network (RAN) (which may be referred to herein as "C-RAN") techniques may be used. For instance, usage of cloud RAN may be used to reduce computation (such as of a system), to reduce a power consumption, to support advanced inter-cell coordination functions such as CoMP and/or to perform other operations.

In some embodiments, the FI network may be implemented by a soft defined network (SDN) switch 705 to lead the packet to the correct network equipment. In some embodiments, the SDN switch 705 could be merged into the central unit (such as physically or otherwise). To make the FI network low-cost and flexible, the FI network in C-RAN may be shared by some or all distributed units in a statistical multiplexing manner. For instance, the FI-network may be based on an Ethernet and/or related techniques. In some cases, even with potential benefits of flexibility and scalability, FI-based C-RAN system may face challenges related to latency, jitter and/or other aspect in the front-haul network.

In some embodiments, in the architecture of FI-based C-RAN, RAN functionality may be split between a central unit and one or more distributed units. In some cases, the split may be realized in user-plane functions and layer-2 MAC control functions, but may not necessarily be related to the layer-3 RRC functions. Without a split in the layer-3 RRC functions, some or all of the RRC signaling originated by a UE or MME 725 may be transferred to a central unit through the front-haul network. For some services for which wide-range coordination may be used, like radio resource management, the central unit could provide global optimization in some cases. But for services for which a relatively fast response may be specified, beneficial and/or necessary, like critical machine type communication (MTC), ultra-reliable and low-latency communications (URLLC) and/or Fifth Generation (5G) communication, the introduced latency by front-haul network may not be acceptable, in some cases.

In some embodiments, RRC functionality of connection control may be split between an RCU 720 and one or more RDUs 710. Some or all of the concepts, techniques, operations and/or methods described herein may be applicable to 5G networks and/or protocols, although the scope of embodiments is not limited in this respect. For instance, some or all of the concepts, techniques, operations and/or methods described herein may be applicable to a 5G objective such as the "Study on Next Generation New Radio Access Technology" or similar. Accordingly, some or all of the concepts, techniques, operations and/or methods described herein may be applicable to a feasibility of different options of splitting an architecture into a "central unit" and a "distributed unit" with potential interface in between, including transport, configuration and other required functional interactions between these nodes (RAN2 RAN3).

In some embodiments, in a RAN, one or more RRC functions may be split into two parts, handled by the RCU 720 and one or more RDUs 710. Non-limiting examples of such RRC functions may include, but are not limited to: system information transfer, connection control, mobility control, operations related to self-optimization network (SON) operations. In a non-limiting example, such functions may be performed in accordance with the following table.

| RRC function category | Execution location | Reason |
| --- | --- | --- |
| System information transfer | RDU | Direct information broadcasting to UE, without gain from central processing |
| Connection control | RDU and RCU | Both low-latency and high-capacity are required in this function, may benefit from collaboration of RDU and RCU |
| Mobility control | RDU and RCU | Both low-latency and high-capacity are required in this function, may benefit from collaboration of RDU and RCU |
| SON | RCU | This function is semi-static processing, global optimization gain may be maximized |

In some embodiments, the RRC functions of connection control and mobility control may be split between RDU(s) 710 and RCU 720 in a manner in which the RCU 720 is responsible for load management, including arranging the load (like traffic, connections) across the network of multiple cells. The RDU 710 may be responsible for admission management, including creating, modifying and deleting RRC connections and radio bearers.

In some embodiments, when connection control or mobility control is triggered at the RDU 710, a service request message may be sent from RDU 710 to RCU 720, to trigger load management at RCU 720. To softly restrict the RRC processing latency, a timer may be started simultaneously to regulate the maximum response time from RCU 720 to RDU 710. If the service response message returns before the timer expires, the admission management at RDU 710 may be based on the information from RCU 720. Otherwise, the admission management may be based on information at the RDU 710. In some embodiments, the length of the timer may be dependent on the urgency of the requested connection or mobility. In some embodiments, RRC function use cases may include the connection setup for a new UE, the addition or modification of service bearer for a connected UE, the admission of incoming handover in the target cell.

In some embodiments, a split of RRC functionality (like admission management) executed at the RDU 710 could mitigate and/or avoid the latency or jitter of message transfer in front-haul interface, accelerating the connection process and reduce service interruption. In addition, the split of the RRC functionality (like load management) executed at the RCU 720 could optimize (or at least improve) the network resource utilization, and balance the load within the network.

In some embodiments, connection control and mobility control may use collaboration between the RDU 710 and RCU 720. Example procedures of connection control may include, but are not limited to, RRC procedures related to connection or bearer addition, removal or modification. Example procedures of mobility control may include, but are not limited to, RRC procedures related to camped or served cell change.

Example signaling message are shown in the following table.

| Index | Name | Direction | Usage |
| --- | --- | --- | --- |
| 1 | SERVICE_REQUEST | RDU to RCU | RDU requests RCU to do central control |
| 2 | SERVICE_RESPONSE | RCU to RDU | RCU responds central control result to RDU |
| 3 | INFORMATION_INDICATION_UL | RDU to RCU | RDU indicates information to RCU |
| 4 | INFORMATION_INDICATION_DL | RCU to RDU | RCU indicates information to RDU |

The message of SERVICE_REQUEST may include the information (like status, parameters and/or other) of a requested service. The message of SERVICE_RESPONSE may include result(s) of the requested service (if accepted, if supported, parameter(s) and/or other). The interface messages of INFORMATION_INDICATION_UL and INFORMATION_INDICATION_DL may be auxiliary messages to the SERVICE_REQUEST and SERVICE_RESPONSE. The interface messages may include updated information (such as for the service and/or other information), in some cases.

In some embodiments, the RDU 710 may interface to the UE 102 (such as over a wireless link). The RDU 710 may execute one or more RRC functions for which collaboration with other cells and/or other RDUs 710 may not necessarily be performed. For instance, operation(s) related to system information transfer may be performed by the RDU 710.

In some embodiments, when connection control or mobility control is triggered by a particular UE 102, the RDU 710 may perform admission management based on the cell load status and/or other factors. As part of the admission management, the RDU 710 may perform one or more operations, including but not limited to: decide whether the connection or mobility request is to be performed and/or allowed; execute associated procedures with external nodes, like the UE 102, MME 122, gateway and/or other; and/or other operation(s). The used cell load status may originate from the RDU 710 (based on the resource utilization situation of the cell(s) controlled by the RDU 710 and/or other factors) or from the RCU 720 (based on the resource utilization situation of the network controlled by the RCU 720 and/or other factors).

In some embodiments, the RDU 710 may send, to the RCU 720, a SERVICE_REQUEST that may include information of the requested connection or mobility, the request of load redistribution. The RDU 710 may start a timer simultaneously. The length of the timer may be dependent on the urgency of the requested connection or mobility, in some cases. If the RDU 710 receives a SERVICE_RESPONSE before the timer expires, the RDU 710 may execute admission management based on the information included in the SERVICE_RESPONSE. Otherwise, the RDU 710 may execute admission management based on the information owned by itself. By adjusting the length of this timer, a priority weight may be softly shifted between the RDU 710 and the RCU 720. As the length increases, operations may be shifted to the RCU 720 over the RDU 710. If the timer length is set to zero (and/or other predetermined value), the connection control or mobility control may be fully determined by the RDU 710. If the timer length is set to infinity (and/or other predetermined value), the connection control or mobility control may be fully determined by the RCU 720. The length of this timer (or other equivalent information) may also be included in the SERVICE_REQUEST. Accordingly, the RCU 720 may be aware of the urgency of such a service request and may take action(s) accordingly.

In some embodiments, the RCU 720 may not necessarily have a direct interface (link) to communicate with the UE 102, but may have an interface to communicate directly with a number of RDUs 710 among the network. So it may be suitable, in some cases, to execute one or more RRC functions that may not necessarily use, need, require and/or specify a relatively low latency, but may use, need, require and/or specify global collaboration or joint optimization among cells. A self-optimization network (SON) function may be an example of such.

In some embodiments, for connection control or mobility control, the RCU 720 may receive the SERVICE_REQUEST sent from the RDU 710, and may then perform load management for the network. The RCU 720 may re-distribute a load among cells, in some cases. For instance, the RCU 720 may leave sufficient load volume for new requests for connection or mobility, and may feedback the result to the RDU 710 in a SERVICE_RESPONSE message. If the timer length is included in the SERVICE_REQUEST, the RCU 720 may attempt to finish associated operations before the timer expires, in some cases. In some embodiments, the RDU 710 and the RCU 720 may utilize the messages of INFORMATION_INDICATION_UL and/or INFORMATION_INDICATION_DL to exchange information, including but not limited to load status, service status, one or more results of an RRC operation (such as connection control, mobility control and/or other operation(s)).

In some embodiments, a radio access network (RAN) system may include an RCU 720 and one or more RDUs 710 connected by a front-haul interface. One or more Radio Resource Control (RRC) layer functions may be split between the RCU 720 and RDU(s) 710. In some embodiments, the RRC layer functions may include system information transfer, connection control, mobility control, self-optimization network (SON) operations and/or other. In some embodiments, load management may be performed at the RCU 720.

In some embodiments, admission management may be performed at the RDU(s) 710. In some embodiments, the RCU 720 may calculate global load information and/or re-distribute a load of a cell to its overlapped neighbor cells. The RCU 720 may send the calculated global load information to the RDU(s) 710. In some embodiments, the RDU 710 may calculate local load information. The RDU 710 may receive the global load information from the RCU 720. The RDU 710 may determine whether a connection request or a mobility request is to be performed and/or whether the connection request or the mobility request is permitted. The determination may be performed in accordance with the calculated local load information and/or the received global load information.

In some embodiments, the RDU 710 may send an indication to the RCU 720 to trigger calculation of the global load information. The RDU 710 may start a timer upon sending of the indicator. The RDU 710 may determine whether a connection request or a mobility request is to be performed and/or whether the connection request or the mobility request is permitted. The determination may be performed in accordance with the received global load information if the global load information is received before the timer expires. The determination may be performed in accordance with the calculated local load information if the global load information is not received before the timer expires.

In some embodiments, the length of the timer may be dependent on the urgency of the connection request or the urgency of the mobility request.

In Example 1, an apparatus of an Evolved Node-B (eNB) may comprise memory. The apparatus may further comprise processing circuitry. The processing circuitry may be configured to implement a radio access network (RAN) distributed unit (RDU) to communicate with a RAN central unit (RCU) of a cloud RAN to cooperatively perform at least radio resource control (RRC) functionality for the eNB. The processing circuitry may be further configured to, at the RDU: decode a request for an RRC connection from a User Equipment (UE); encode, for communication to the RCU, a service request for global load information to determine whether to establish the requested RRC connection, the global load information based at least partly on per-eNB load information of other eNBs supported by the cloud RAN; when a service response from the RCU is received in response to the service request before a predetermined time, determine whether to establish the requested RRC connection based at least partly on the global load information included in the service response; and when a service response is not received in response to the service request before the predetermined time, determine whether to establish the requested RRC connection based on local load information of the eNB.

In Example 2, the subject matter of Example 1, wherein the local load information of the eNB may be based at least partly on a number of RRC connections supported by the eNB. The per-eNB load information of the other eNBs may be based at least partly on numbers of RRC connections supported by the other eNBs.

In Example 3, the subject matter of one or any combination of Examples 1-2, wherein the processing circuitry may be further configured to, at the RDU: when the service response is received before the predetermined time: determine to establish the RRC connection when the number of RRC connections supported by the eNB is less than or equal to a first threshold; and select another eNB to establish the RRC connection when the number of RRC connections supported by the eNB is greater than the first threshold and the number of RRC connections supported by the other eNB is less than or equal to a second threshold.

In Example 4, the subject matter of one or any combination of Examples 1-3, wherein the processing circuitry may be further configured to, at the RDU: when the service response is not received before the predetermined time: determine to establish the RRC connection when the number of RRC connections supported by the eNB is less than or equal to a third threshold; and determine to refrain from establishment of the RRC connection when the number of RRC connections supported by the eNB is greater than the third threshold.

In Example 5, the subject matter of one or any combination of Examples 1-4, wherein the processing circuitry further configured to, at the RDU, set the predetermined time based on a priority level of the requested RRC connection.

In Example 6, the subject matter of one or any combination of Examples 1-5, wherein the processing circuitry may be further configured to, at the RDU: set the predetermined time to a first value when the requested RRC connection is for mission critical (MC) communication; and set the predetermined time to a second value when the requested RRC connection is for non-MC communication, the second value larger than the first value.

In Example 7, the subject matter of one or any combination of Examples 1-6, wherein the predetermined time may be indicated by the service request. A value of zero for the predetermined time may indicate that the RDU does not intend to use the global load information to determine whether to establish the requested RRC connection. A value greater than zero for the predetermined time may indicate that the RDU intends to use the global load information to determine whether to establish the requested RRC connection.

In Example 8, the subject matter of one or any combination of Examples 1-7, wherein the processing circuitry may be further configured to, at the RDU, initiate a timer for the service response from the RCU. The predetermined time may be based on a summation that includes a predetermined duration and an initiation time of the timer.

In Example 9, the subject matter of one or any combination of Examples 1-8, wherein the processing circuitry may be further configured to, at the RDU: determine the local load information of the eNB based at least partly on a number of RRC connections at the eNB or on data rates of the RRC connections at the eNB; and encode, for communication to the RCU, a message that includes the local load information of the eNB.

In Example 10, the subject matter of one or any combination of Examples 1-9, wherein the processing circuitry may be further configured to, at the RDU, encode, for transmission, one or more system information blocks (SIBs) that include RRC configuration information for usage by UEs to request RRC connections.

In Example 11, the subject matter of one or any combination of Examples 1-10, wherein the processing circuitry may be further configured to, at the RDU: encode, for transmission, a request for self-organization network (SON) information from the RCU, the SON information based on cellular layout, sector layout or channel usage by the other eNBs; and determine channel usage for the eNB based at least partly on the received SON information.

In Example 12, the subject matter of one or any combination of Examples 1-11, wherein the requested RRC connection is a first requested RRC connection, the UE is a first UE, the service request is a first service request, the service response is a first service response, and the predetermined time is a first predetermined time. The processing circuitry may be further configured to, at the RDU: decode a mobility request from a second UE for a hand-over of a second RRC connection to the eNB from another eNB or for a hand-over of the second RRC connection from the eNB to another eNB; encode, for communication to the RCU, a second service request for global load information to determine whether to accept the mobility request; when the second service response is received before a second predetermined time, determine whether to accept the mobility request based at least partly on the global load information included in the second service response; and when the second service response is not received before the second predetermined time, determine whether to accept the mobility request based on local load information of the eNB.

In Example 13, the subject matter of one or any combination of Examples 1-12, wherein the memory may be configurable to store the global load information.

In Example 14, the subject matter of one or any combination of Examples 1-13, wherein the apparatus may further include a transceiver to receive the request for the RRC connection from the UE.

In Example 15, the subject matter of one or any combination of Examples 1-14, wherein the processing circuitry may include a baseband processor to determine whether to establish the requested RRC connection.

In Example 16, a computer-readable storage medium may store instructions for execution by one or more processors to perform operations for communication by an Evolved Node-B (eNB). The operations may configure the one or more processors to encode, for communication to a radio access network (RAN) central unit (RCU) of a cloud RAN, a service request for global load information of the cloud RAN for which the RCU serves as a central entity for distribution of information between RAN distributed units (RDUs) of the cloud RAN. The operations may further configure the one or more processors to determine whether to initiate a handover of a radio resource control (RRC) connection between the eNB and a User Equipment (UE) to another eNB based at least partly on the global load information and further based at least partly on local load information of the eNB. The RDUs may be implemented at a plurality of eNBs for performance of at least RRC functionality for the eNBs cooperatively within the cloud RAN. The global information may be based at least partly on per-eNB load information of the eNBs.

In Example 17, the subject matter of Example 16, wherein the operations may further configure the one or more processors to encode the service request and to determine whether to initiate the handover as part of an RDU of the eNB allocated at least partly to perform RRC functionality for the eNB cooperatively within the cloud RAN.

In Example 18, the subject matter of one or any combination of Examples 16-17, wherein the local load information may be based on a number of RRC connections supported by the eNB. The global load information may be based on per-eNB numbers of RRC connections supported by the plurality of eNBs. The operations may further configure the one or more processors to determine to initiate the handover of the RRC connection to another eNB when the number of RRC connections supported by the eNB is above a first threshold and when the number of RRC connections supported by the other eNB is less than a second threshold.

In Example 19, a radio access network (RAN) central unit (RCU) may comprise an interface. The apparatus may further comprise processing circuitry. The processing circuitry may be configured to receive, from the interface, per-eNB load information for a plurality of eNBs, the per-eNB load information received from a plurality of radio access network (RAN) distributed units (RDUs) hosted by the eNBs. The RCU may operate as a central entity of a cloud RAN to communicate with the RDUs to cooperatively perform at least radio resource control (RRC) functionality for the eNBs. The processing circuitry may be further configured to receive, from the interface, a service request from a particular RDU that indicates an RRC connection request at the eNB that hosts the particular RDU. The processing circuitry may be further configured to determine global load information based at least partly on the per-eNB load information, wherein the global load information is determined in accordance with a time restriction indicated in the service request. The processing circuitry may be further configured to send, on the interface and to the particular RDU and in response to the service request, a service response that includes the global load information.

In Example 20, the subject matter of Example 19, wherein the per-eNB load information of the plurality of eNBs may be based at least partly on numbers of RRC connections supported by the eNBs.

In Example 21, the subject matter of one or any combination of Examples 19-20, wherein the processing circuitry may be further configured to receive, from the interface, a request for self-organization network (SON) information from the particular RDU. The processing circuitry may be further configured to determine the SON information based at least partly on cellular layout, sector layout or channel usage by the plurality of eNBs.

In Example 22, the subject matter of one or any combination of Examples 19-21, wherein the processing circuitry may be further configured to determine, based at least partly on the load information of the eNB that hosts the particular RDU and on the load information of one or more neighboring eNBs, which of the eNBs is to establish the requested RRC connection. The processing circuitry may be further configured to send, on the interface, a message to the eNB that hosts the particular RDU. The message may indicate whether the eNB that hosts the particular RDU is to establish the RRC connection.

In Example 23, the subject matter of one or any combination of Examples 19-22, wherein the service request is a first service request, the particular RDU is a first RDU, the RRC connection is a first RRC connection, the eNB that hosts the first RDU is a first eNB, the global load information is first global load information, the service response is a first service response, and the time restriction is a first time restriction. The processing circuitry may be further configured to receive, from the interface, a second service request from a second RDU that indicates a mobility request for a hand-over of a second RRC connection from a second eNB that hosts the second RDU. The processing circuitry may be further configured to determine second global load information. The processing circuitry may be further configured to send, on the interface and to the second RDU and in response to the second service request, a second service response that includes the second global load information. The second global load information may be determined in accordance with a second time restriction indicated in the second service request.

In Example 24, a radio access network (RAN) distributed unit (RDU) may comprise an interface. The RDU may further comprise processing circuitry. The processing circuitry may be configured to receive, on the interface, per-Evolved Node-B (eNB) load information from a plurality of eNBs for which the RDU is to perform radio resource control (RRC) operations cooperatively with a RAN central unit (RCU) of a cloud RAN. The processing circuitry may be further configured to receive, from a particular eNB of the plurality, an indicator of a request for an RRC connection between the particular eNB and a User Equipment (UE). The processing circuitry may be further configured to send, to the RCU on the interface, a service request for global load information to determine whether to establish the requested RRC connection. The global load information may be based at least partly on per-eNB load information of other eNBs supported by the cloud RAN. The processing circuitry may be further configured to, when a service response from the RCU is received in response to the service request before a predetermined time, determine whether to establish the requested RRC connection based at least partly on the global load information included in the service response. The processing circuitry may be further configured to, when a service response is not received in response to the service request before the predetermined time, determine whether to establish the requested RRC connection based on the per-eNB load information of the plurality of eNBs.

In Example 25, the subject matter of Example 24, wherein the processing circuitry may be further configured to send, to the particular eNB on the interface, an indicator of whether the RRC connection is to be established.

In Example 26, an apparatus of an Evolved Node-B (eNB) may comprise means for encoding, for communication to a radio access network (RAN) central unit (RCU) of a cloud RAN, a service request for global load information of the cloud RAN for which the RCU serves as a central entity for distribution of information between RAN distributed units (RDUs) of the cloud RAN. The apparatus may further comprise means for determining whether to initiate a handover of a radio resource control (RRC) connection between the eNB and a User Equipment (UE) to another eNB based at least partly on the global load information and further based at least partly on local load information of the eNB. The RDUs may be implemented at a plurality of eNBs for performance of at least RRC functionality for the eNBs cooperatively within the cloud RAN. The global information may be based at least partly on per-eNB load information of the eNBs.

In Example 27, the subject matter of Example 26, wherein the apparatus may further comprise means for encoding the service request and means for determining whether to initiate the handover as part of an RDU of the eNB allocated at least partly to perform RRC functionality for the eNB cooperatively within the cloud RAN.

In Example 28, the subject matter of one or any combination of Examples 26-27, wherein the local load information may be based on a number of RRC connections supported by the eNB. The global load information may be based on per-eNB numbers of RRC connections supported by the plurality of eNBs. The apparatus may further comprise means for determining to initiate the handover of the RRC connection to another eNB when the number of RRC connections supported by the eNB is above a first threshold and when the number of RRC connections supported by the other eNB is less than a second threshold.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus, apparatus comprising:

memory; and processing circuitry, configured to:

implement a radio access network (RAN) distributed unit (RDU) to communicate with a RAN central unit (RCU) of a cloud RAN to cooperatively perform at least radio resource control (RRC) functionality for a base station; and at the RDU:

decode a request for an RRC connection from a User Equipment (UE);

encode, for communication to the RCU, a service request for global load information to determine whether to establish the requested RRC connection, the global load information based at least partly on per-base station load information of other base stations supported by the cloud RAN;

when a service response from the RCU is received in response to the service request before a predetermined time, determine whether to establish the requested RRC connection based at least partly on the global load information included in the service response; and when a service response is not received in response to the service request before the predetermined time, determine whether to establish the requested RRC connection based on local load information of the base station.

2. The apparatus according to claim 1, wherein the local load information of the base station is based at least partly on a number of RRC connections supported by the base station; and wherein the per-base station load information of the other base stations is based at least partly on numbers of RRC connections supported by the other base stations.

3. The apparatus according to claim 2, wherein the processing circuitry is further configured to, at the RDU:

when the service response is received before the predetermined time:
   determine to establish the RRC connection when the number of RRC connections supported by the base station is less than or equal to a first threshold; and
   select another base station to establish the RRC connection when the number of RRC connections supported by the base station is greater than the first threshold and the number of RRC connections supported by the other base station is less than or equal to a second threshold.

4. The apparatus according to claim 3,
wherein the processing circuitry is further configured to, at the RDU:
   when the service response is not received before the predetermined time:
      determine to establish the RRC connection when the number of RRC connections supported by the base station is less than or equal to a third threshold; and
      determine to refrain from establishment of the RRC connection when the number of RRC connections supported by the base station is greater than the third threshold.

5. The apparatus according to claim 1,
wherein the processing circuitry is further configured to, at the RDU:
   set the predetermined time based on a priority level of the requested RRC connection.

6. The apparatus according to claim 5,
wherein the processing circuitry is further configured to, at the RDU:
   set the predetermined time to a first value when the requested RRC connection is for mission critical (MC) communication; and
   set the predetermined time to a second value when the requested RRC connection is for non-MC communication, the second value larger than the first value.

7. The apparatus according to claim 1,
wherein the predetermined time is indicated by the service request;
wherein a value of zero for the predetermined time indicates that the RDU does not intend to use the global load information to determine whether to establish the requested RRC connection; and
wherein a value greater than zero for the predetermined time indicates that the RDU intends to use the global load information to determine whether to establish the requested RRC connection.

8. The apparatus according to claim 1,
wherein the processing circuitry is further configured to, at the RDU:
   initiate a timer for the service response from the RCU, wherein the predetermined time is based on a summation that includes a predetermined duration and an initiation time of the timer.

9. The apparatus according to claim 1,
wherein the processing circuitry is further configured to, at the RDU:
   determine the local load information of the eNB based at least partly on a number of RRC connections at the base station or on data rates of the RRC connections at the base station; and
   encode, for communication to the RCU, a message that includes the local load information of the base station.

10. The apparatus according to claim 1,
wherein the processing circuitry is further configured to, at the RDU:
   encode, for transmission, one or more system information blocks (SIBs) that include RRC configuration information for usage by UEs to request RRC connections.

11. The apparatus according to claim 1,
wherein the processing circuitry is further configured to, at the RDU:
   encode, for transmission, a request for self-organization network (SON) information from the RCU, the SON information based on cellular layout, sector layout or channel usage by the other base stations; and
   determine channel usage for the base station based at least partly on the received SON information.

12. The apparatus according to claim 1,
wherein the requested RRC connection is a first requested RRC connection, wherein the UE is a first UE, wherein the service request is a first service request, wherein the service response is a first service response, wherein the predetermined time is a first predetermined time, and wherein the processing circuitry is further configured to, at the RDU:
   decode a mobility request from a second UE for a hand-over of a second RRC connection to the base station from another base station or for a hand-over of the second RRC connection from the base station to another base station;
   encode, for communication to the RCU, a second service request for global load information to determine whether to accept the mobility request;
   when the second service response is received before a second predetermined time, determine whether to accept the mobility request based at least partly on the global load information included in the second service response; and
   when the second service response is not received before the second predetermined time, determine whether to accept the mobility request based on local load information of the eNB.

13. The apparatus according to claim 1,
wherein the memory is configurable to store the global load information.

14. The apparatus according to claim 1,
wherein the apparatus further includes a transceiver to receive the request for the RRC connection from the UE.

15. The apparatus according to claim 1,
wherein the processing circuitry includes a baseband processor to determine whether to establish the requested RRC connection.

16. A radio access network (RAN) central unit (RCU), the RCU comprising:
an interface; and
processing circuitry, configured to:
   receive, from the interface, per-base station load information for a plurality of base stations, the per-base station load information received from a plurality of radio access network (RAN) distributed units (RDUs) hosted by the base stations, wherein the RCU is to operate as a central entity of a cloud RAN to communicate with the RDUs to cooperatively perform at least radio resource control (RRC) functionality for the base stations;

receive, from the interface, a service request from a particular RDU that indicates an RRC connection request at the base station that hosts the particular RDU;

determine global load information based at least partly on the per-base station load information, wherein the global load information is determined in accordance with a time restriction indicated in the service request; and send, on the interface and to the particular RDU and in response to the service request, a service response that includes the global load information.

17. The RCU according to claim 16,
wherein the per-base station load information of the plurality of base stations is based at least partly on numbers of RRC connections supported by the base stations.

18. The RCU according to claim 16,
wherein the processing circuitry is further configured to:
receive, from the interface, a request for self-organization network (SON) information from the particular RDU; and
determine the SON information based at least partly on cellular layout, sector layout or channel usage by the plurality of base stations.

19. The RCU according to claim 16,
wherein the processing circuitry is further configured to:
determine, based at least partly on the load information of the base station that hosts the particular RDU and on the load information of one or more neighboring base stations, which of the base stations is to establish the requested RRC connection; and
send, on the interface, a message to the base station that hosts the particular RDU, wherein the message indicates whether the base station that hosts the particular RDU is to establish the RRC connection.

20. The RCU according to claim 16,
wherein the service request is a first service request, wherein the particular RDU is a first RDU, wherein the RRC connection is a first RRC connection, wherein the base station that hosts the first RDU is a first base station, wherein the global load information is first global load information, wherein the service response is a first service response, wherein the time restriction is a first time restriction, and wherein the processing circuitry is further configured to:
receive, from the interface, a second service request from a second RDU that indicates a mobility request for a hand-over of a second RRC connection from a second base station that hosts the second RDU;
determine second global load information; and
send, on the interface and to the second RDU and in response to the second service request, a second service response that includes the second global load information, wherein the second global load information is determined in accordance with a second time restriction indicated in the second service request.

21. A radio access network (RAN) distributed unit (RDU), the RDU comprising:
an interface; and
processing circuitry, configured to:
receive, on the interface, per-base station load information from a plurality of base stations for which the RDU is to perform radio resource control (RRC) operations cooperatively with a RAN central unit (RCU) of a cloud RAN;

receive, from a particular base station of the plurality, an indicator of a request for an RRC connection between the particular base station and a User Equipment (UE);
send, to the RCU on the interface, a service request for global load information to determine whether to establish the requested RRC connection, the global load information based at least partly on per-base station load information of other base stations supported by the cloud RAN;
when a service response from the RCU is received in response to the service request before a predetermined time, determine whether to establish the requested RRC connection based at least partly on the global load information included in the service response; and
when a service response is not received in response to the service request before the predetermined time, determine whether to establish the requested RRC connection based on the per-base station load information of the plurality of base stations.

22. The RDU according to claim 21,
wherein the processing circuitry is further configured to send, to the particular base station on the interface, an indicator of whether the RRC connection is to be established.

23. A non-transitory computer-readable storage medium that stores instructions executable one or more processors to perform operations for communication by a base station, the operations to configure the one or more processors to:
implement a radio access network (RAN) distributed unit (RDU) to communicate with a RAN central unit (RCU) of a cloud RAN to cooperatively perform at least radio resource control (RRC) functionality for the base station; and
at the RDU:
decode a request for an RRC connection from a User Equipment (UE);
encode, for communication to the RCU, a service request for global load information to determine whether to establish the requested RRC connection, the global load information based at least partly on per-base station load information of other base stations supported by the cloud RAN;
when a service response from the RCU is received in response to the service request before a predetermined time, determine whether to establish the requested RRC connection based at least partly on the global load information included in the service response; and
when a service response is not received in response to the service request before the predetermined time, determine whether to establish the requested RRC connection based on local load information of the base station.

24. The non-transitory computer-readable storage medium according to claim 23,
wherein the local load information of the base station is based at least partly on a number of RRC connections supported by the base station; and
wherein the per-base station-load information of the other base stations is based at least partly on numbers of RRC connections supported by the other base stations.

25. The non-transitory computer-readable storage medium according to claim 23, wherein the predetermined time is indicated by the service request;
wherein a value of zero for the predetermined time indicates that the RDU does not intend to use the global load information to determine whether to establish the requested RRC connection; and
wherein a value greater than zero for the predetermined time indicates that the RDU intends to use the global load information to determine whether to establish the requested RRC connection.

* * * * *